(12) United States Patent
Lin et al.

(10) Patent No.: US 10,115,125 B2
(45) Date of Patent: Oct. 30, 2018

(54) DETERMINING TRAFFIC QUALITY USING EVENT-BASED TRAFFIC SCORING

(71) Applicant: Yahoo! Inc., Sunnyvale, CA (US)

(72) Inventors: Zhangang Lin, Beijing (CN); Fei Peng, Beijing (CN); Xianen Qiu, Beijing (CN)

(73) Assignee: Excalibur IP, LLC, Sunnyvale, CA (US)

( * ) Notice: Subject to any disclaimer, the term of this patent is extended or adjusted under 35 U.S.C. 154(b) by 673 days.

(21) Appl. No.: 14/401,601

(22) PCT Filed: Jun. 3, 2014

(86) PCT No.: PCT/CN2014/079061
§ 371 (c)(1),
(2) Date: Nov. 17, 2014

(87) PCT Pub. No.: WO2015/184579
PCT Pub. Date: Dec. 10, 2015

(65) Prior Publication Data
US 2016/0267525 A1  Sep. 15, 2016

(51) Int. Cl.
*G06Q 30/00*  (2012.01)
*G06Q 30/02*  (2012.01)

(52) U.S. Cl.
CPC ......... *G06Q 30/0246* (2013.01); *G06Q 30/02* (2013.01)

(58) Field of Classification Search
None
See application file for complete search history.

(56) References Cited

U.S. PATENT DOCUMENTS 8,239,393 B1 * 8/2012 Guo .................. G06F 17/30702
707/748
9,027,127 B1 * 5/2015 Soldo .................. H04L 63/1425
705/14.2

(Continued)

FOREIGN PATENT DOCUMENTS

CN    102136115 A    7/2011
WO   2008134184 A1   11/2008

OTHER PUBLICATIONS

International Preliminary Report on Patentability dated Dec. 6, 2016 in International Application No. PCT/CN2014/079061.

(Continued)

*Primary Examiner* — Matthew T Sittner
(74) *Attorney, Agent, or Firm* — Pillsbury Winthrop Shaw Pittman LLP

(57) ABSTRACT

Methods, systems, and programs are provided to determine event-level traffic quality for event(s) related to user interaction with online content (e.g., via a webpage, a mobile application, etc.). Data related to a current user event and past user events may be received, where such data may include information regarding a set of entities associated with each respective user event. A feature value set for the current user event is generated based on the information regarding the respective sets of entities associated with the current user event and the past user events. Based at least on such feature value set, a traffic quality score for the current user event may be determined, e.g., based on a weighted combination of elements of the feature value set. An entity-level traffic quality score for an entity may be determined based on event-level traffic quality scores of user events that involve that entity.

22 Claims, 21 Drawing Sheets

(56) References Cited

U.S. PATENT DOCUMENTS

| | | | | |
|---|---|---|---|---|
| 2005/0049913 | A1* | 3/2005 | Huddleston | G06K 9/6228 706/13 |
| 2008/0033776 | A1* | 2/2008 | Marchese | G06Q 20/10 705/7.33 |
| 2008/0091524 | A1* | 4/2008 | Yan | G06Q 30/02 705/14.45 |
| 2008/0154717 | A1* | 6/2008 | Saifee | G06Q 30/02 705/14.6 |
| 2008/0162385 | A1* | 7/2008 | Madani | G06F 17/30707 706/12 |
| 2008/0270154 | A1* | 10/2008 | Klots | G06Q 30/02 705/14.4 |
| 2009/0132336 | A1* | 5/2009 | Demir | G06Q 30/02 705/7.29 |
| 2009/0210470 | A1* | 8/2009 | Sarlos | G06K 9/6282 708/400 |
| 2009/0265230 | A1* | 10/2009 | Plachouras | G06Q 30/02 705/14.54 |
| 2010/0268524 | A1* | 10/2010 | Nath | H04L 67/22 703/23 |
| 2010/0268834 | A1* | 10/2010 | Eidelman | H04L 12/2697 709/230 |
| 2010/0269044 | A1* | 10/2010 | Ivanyi | G06Q 30/02 715/736 |
| 2010/0299303 | A1* | 11/2010 | Horster | G06F 17/30029 706/52 |
| 2010/0312624 | A1* | 12/2010 | Bilenko | G06Q 30/02 705/14.5 |
| 2011/0016065 | A1* | 1/2011 | Chapelle | G06N 99/005 706/12 |
| 2012/0005018 | A1* | 1/2012 | Narayanan | G06Q 10/067 705/14.52 |
| 2012/0005204 | A1* | 1/2012 | Diaz | G06N 99/005 707/733 |
| 2013/0018968 | A1* | 1/2013 | Pennacchiotti | G06Q 10/10 709/206 |
| 2013/0173571 | A1* | 7/2013 | Chen | G06F 17/30 707/706 |
| 2013/0297778 | A1* | 11/2013 | Hong | G06F 17/3089 709/224 |
| 2015/0039541 | A1* | 2/2015 | Kapur | G06N 5/04 706/12 |
| 2015/0088644 | A1* | 3/2015 | Shay | G06Q 30/0254 705/14.52 |
| 2015/0205462 | A1* | 7/2015 | Jitkoff | G06F 3/0483 715/777 |
| 2016/0071496 | A1* | 3/2016 | Jones | G06T 3/0075 345/636 |
| 2016/0148255 | A1* | 5/2016 | Shariat | G06Q 30/0255 705/14.53 |
| 2016/0267525 | A1* | 9/2016 | Lin | G06Q 30/02 |

OTHER PUBLICATIONS

International Search Report and Written Opinion dated Mar. 2, 2015 in International Application No. PCT/CN2014/079061.
Extended European Search Report dated Sep. 21, 2017 in European Application 14894038.0.

* cited by examiner

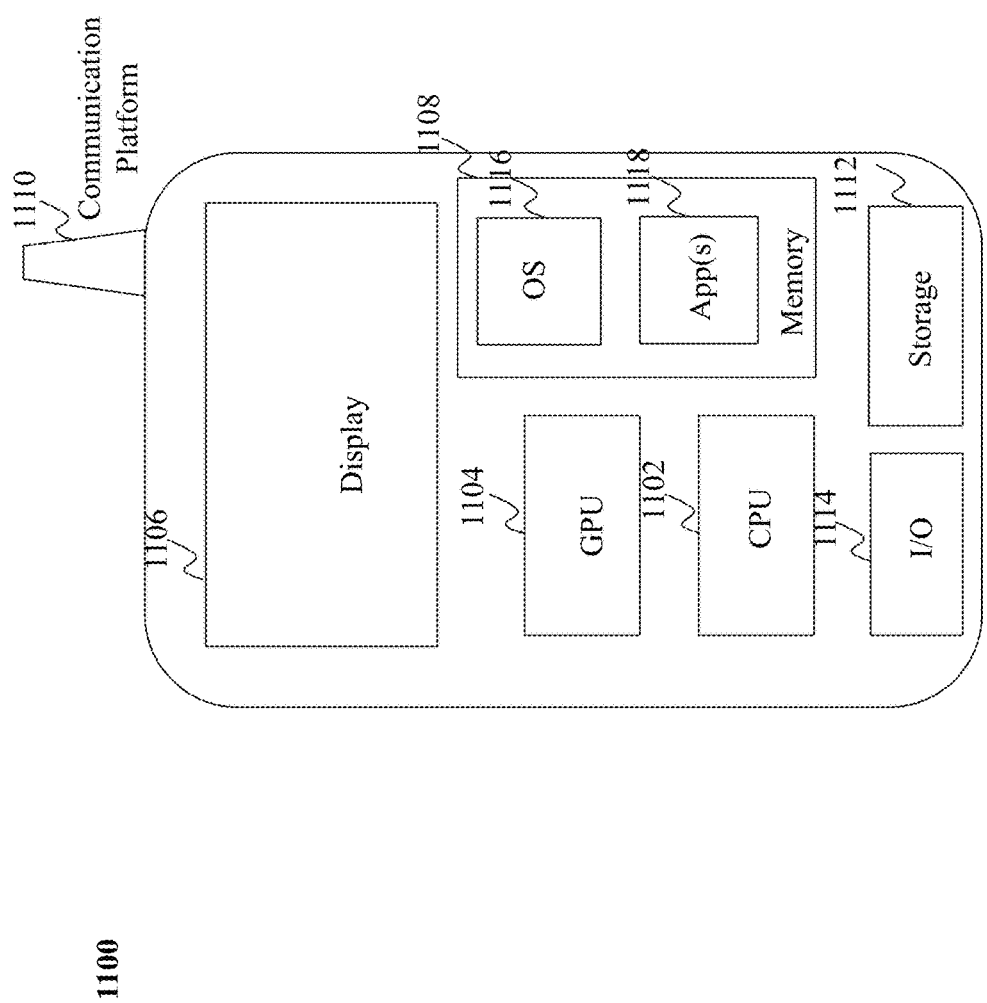

DETERMINING TRAFFIC QUALITY USING EVENT-BASED TRAFFIC SCORING

CROSS REFERENCE TO RELATED APPLICATION

This application is a national stage application, filed under 35 U.S.C. § 371, of International Application No. PCT/CN2014/079061, filed on Jun. 3, 2014, entitled "DETERMINING TRAFFIC QUALITY USING EVENT-BASED TRAFFIC SCORING", which is hereby incorporated by reference in its entirety.

BACKGROUND

1. Technical Field

The present disclosure relates to determining traffic quality with respect to online content.

2. Discussion of Technical Background

Online advertising plays an important role in the Internet. Generally there are three players in the marketplace: publishers, advertisers, and commissioners. Commissioners such as Google, Microsoft and Yahoo!, provide a platform or exchange for publishers and advertisers. However, there are fraudulent players in the ecosystem. Publishers have strong incentives to inflate traffic to charge more from advertisers. Some advertisers may also commit fraud to exhaust competitors' budgets. To protect legitimate publishers and advertisers, commissioners have to take responsibility to fight against fraudulent traffic, otherwise the ecosystem will be damaged and legitimate players would leave. Many current major commissioners have antifraud system, which use rule-based or machine learning filters. These filters usually mark each impression and click with binary flag, either valid or invalid. However, it is hard to simply draw a line between what is valid and invalid. In fact, there is suspicious traffic in a gray area that is not good enough to be valid or not bad enough to be invalid.

Moreover, the data related to ad conversion (i.e., post ad-clicking user activity at advertisers website, etc.) may be sparse, and sometimes advertisers may not be willing to send ad network their conversion data, which makes conversion data collection infeasible. Further, even if advertisers are willing to send ad network their conversion data, it may be that ad conversion tracking is misconfigured, and so the collected conversion data itself may not be of good quality or reliable. Existing traffic quality scoring may only get a traffic quality score at some coarse grain (e.g., as a binary decision flagged as valid or invalid) to mitigate sparse ad conversion data sparse issue, and this may make it different to evaluate traffic quality for relatively small entities in an ad network that may only have relatively small traffic volume.

SUMMARY

The disclosure provided herein relates to methods, systems, and programming to determine event-level traffic quality related to online content (e.g., webpages, websites, Internet-based applications installed on wireless/mobile devices, etc., and/or advertisements provided on or in relation to webpages, websites, Internet-based applications, etc.). More particularly, the present disclosure relates to methods, systems, and programming to determine event-level traffic quality for event(s) related to user interaction with online content, events such as, for example, a user impression (e.g., display) of an advertisement ("ad") provided in relation with online content (e.g., a webpage), a user click on or selection of an online ad, a user "conversion" of an online ad (i.e., an online financial transaction performed and completed by a user for a product or service advertised on the clicked-on or selected ad), etc.

In one aspect of the disclosure, a method, implemented on a machine having at least one processor, storage, and a communication platform connected to a network to determine traffic quality related to online content, is disclosed. In this method, data related to a current user event indicating user interaction (impression, click, etc.) with online content is received. The data related to the current user event may include information regarding a set of entities (e.g., user(s), publisher(s), advertiser(s), ad creative(s), etc.) associated with the current user event. Based on the information regarding the set of entities associated with the current user event, a feature value set for the current user event may be generated, where the feature value set may essentially measures diversity in user traffic or activity across the various entities of the online ad system. Further, an event-level traffic quality score for the current user event may be determined based at least on the generated feature value set, e.g., based on a weighted combination of elements of the feature value set.

In another aspect of the disclosure, a system to determine traffic quality related to online content is disclosed. The system includes a communication platform, a feature set engine, and a traffic quality engine. The communication platform may be configured to receive data related to a current user event indicating user interaction with online content. Such data related to the current user event may include information regarding a set of entities associated with the current user event. The feature set engine may be configured to determine a feature value set for the current user event based on the information regarding the set of entities associated with the current user event. The traffic quality engine may be configured to determine a traffic quality score for the current user event based at least on the feature value set.

In some embodiments, the traffic quality engine includes a feature combination unit configured to calculate a weighted combination value of elements of the feature value, and a traffic score generator configured to generate the traffic quality score for the current user event based on the weighted combination value from the feature combination unit.

Other concepts relate to software for implementing the determination of (event-level) traffic quality for online content. A software product, in accord with this concept, includes at least one machine-readable non-transitory medium and information carried by the medium. The information carried by the medium may be executable program code data regarding parameters in association with a request or operational parameters, such as information related to a user, a publisher of online content, an online advertiser, etc., a request, or a social group, etc.

In one example, a machine readable and non-transitory medium having information recorded thereon to determine traffic quality, where when the information is read by the machine, causes the machine to receive data related to a current user event indicating user interaction (impression, click, etc.) with online content. The data related to the current user event may include information regarding a set of entities (e.g., user(s), publisher(s), advertiser(s), ad creative(s), etc.) associated with the current user event. Based on the information regarding the set of entities associated with the current user event, a feature value set for the current user event may be generated. Further, an event-level traffic quality score for the current user event may be determined based at least on the generated feature value set, e.g., based on a weighted combination of elements of the feature value set.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 11 depicts a general mobile device architecture on which the present teaching may be implemented.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching relates to determining event-level traffic quality for event(s) related to user interaction (e.g., ad click, ad impression, and/or ad conversion) with online content (e.g., on a webpage, in a mobile stand-alone application, etc.). Data related to a current user event and past user events may be received, where such data may include information regarding a set of entities (e.g., publisher(s), advertiser(s), user(s), ad creative(s), etc.) associated with each respective user event. A feature value set for a group of traffic divergence features related to the current user event may be generated to evaluate the traffic quality across the various entities (involved in the online ad system). The feature value set may be generated based on the information regarding the respective sets of entities associated with the current user event and/or the past user events. Based at least on such feature value set, a traffic quality score for the current user event may be determined, e.g., based on a weighted combination of elements of the feature value set.

As such, in contrast with conventional online advertising anti-fraud techniques in which the user events are assigned a binary flag—valid or invalid—the event-level traffic quality scoring technique presented in this disclosure provides real-valued traffic quality scores indicating various degrees or levels of validity (or invalidity) of user events. Further, an event-level traffic quality score may be used as a basis to determine or calculate traffic quality scores at one or more higher granularities (than the event level) of the ad network. Specifically, using the (real-valued) traffic quality scores for multiple user events involving a certain publisher, advertiser, user, or other participant, a traffic quality score for that publisher, advertiser, user, or other participant may be determined, e.g., by computing an average (or another statistical measure) of the event-level traffic quality scores.

Figure 1A:
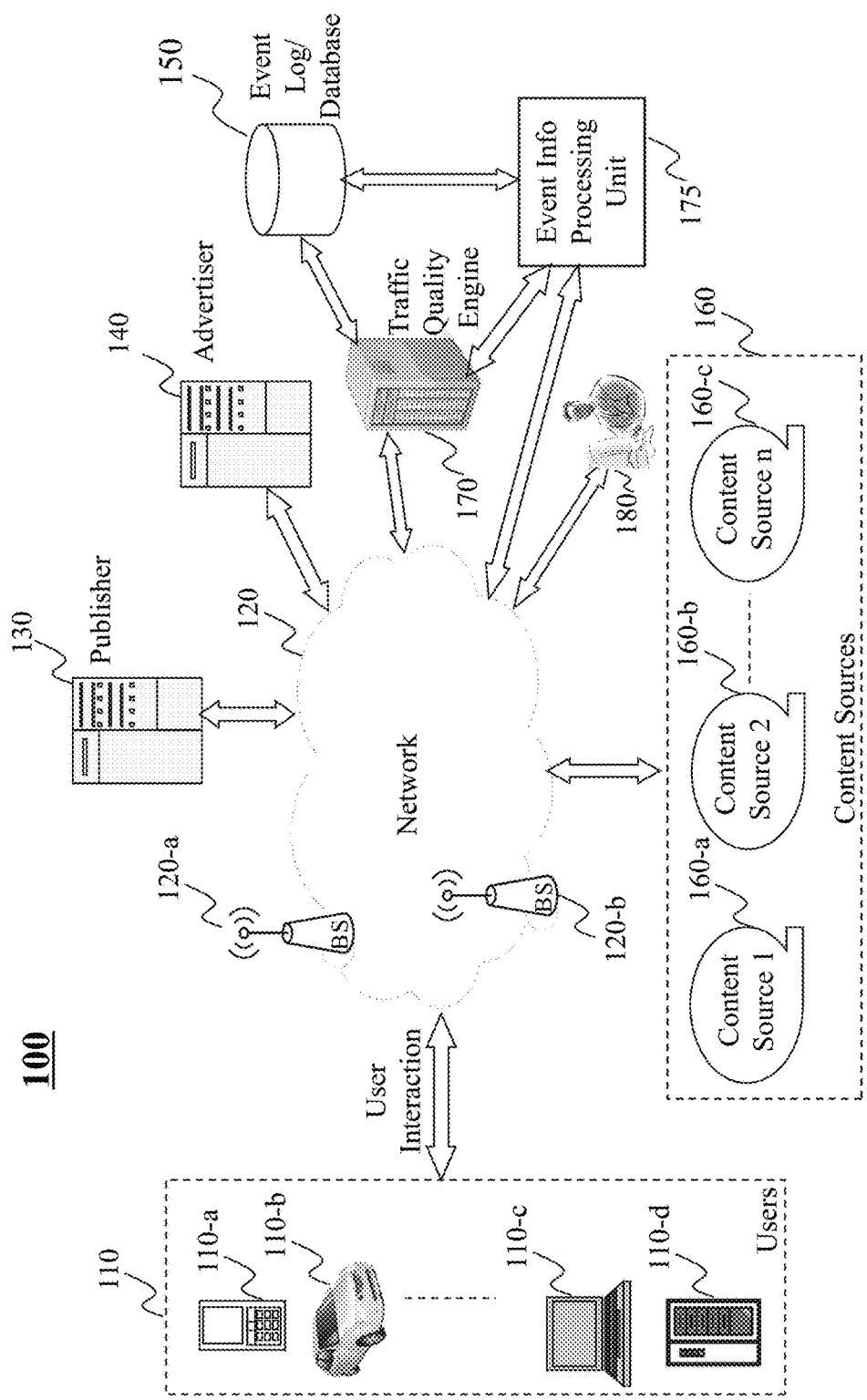
FIGS. 1(a)-1(c) illustrate examples of systems in which the traffic quality monitoring and scoring is implemented in accordance with various embodiments of the present disclosure.
Figure 1B:
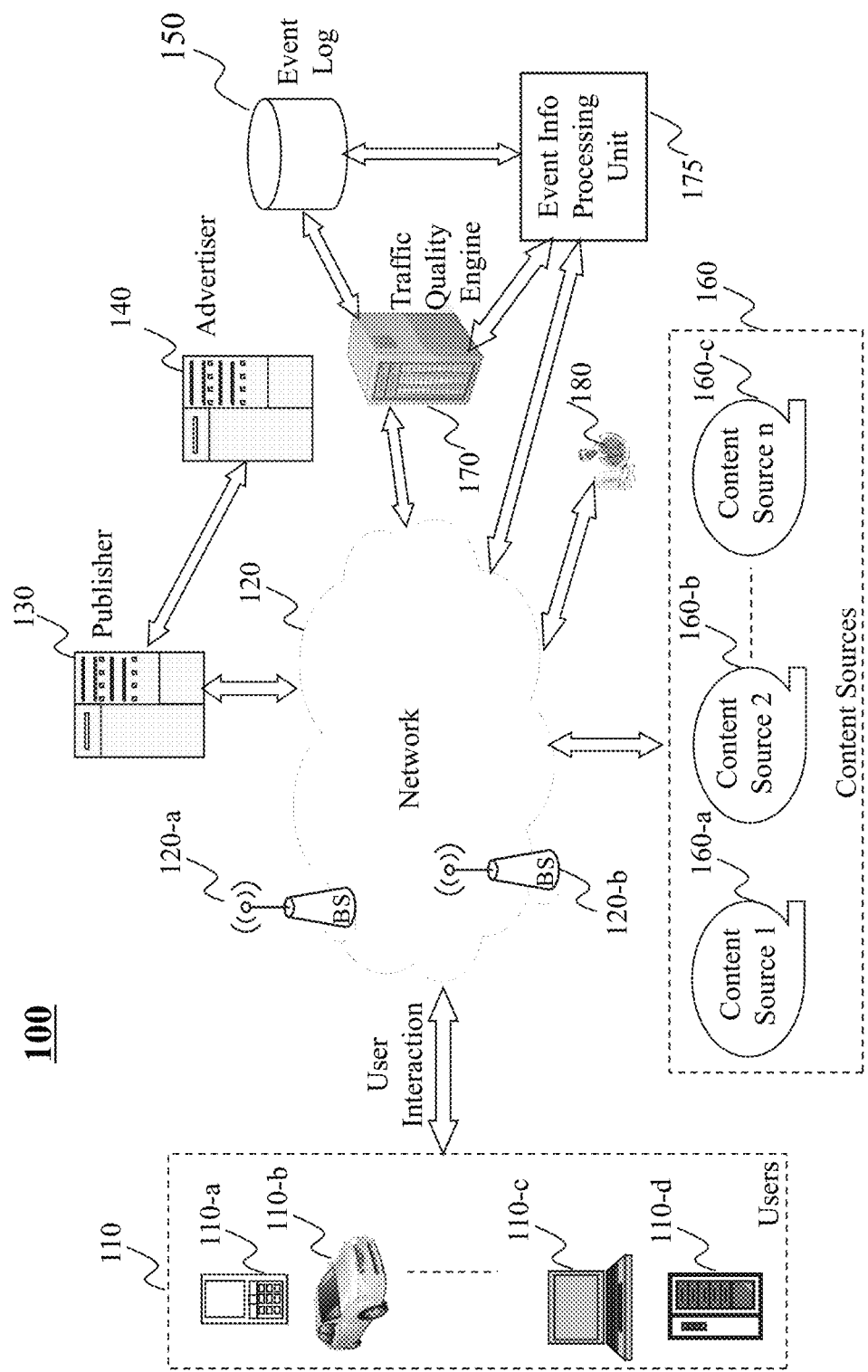
Figure 1C:
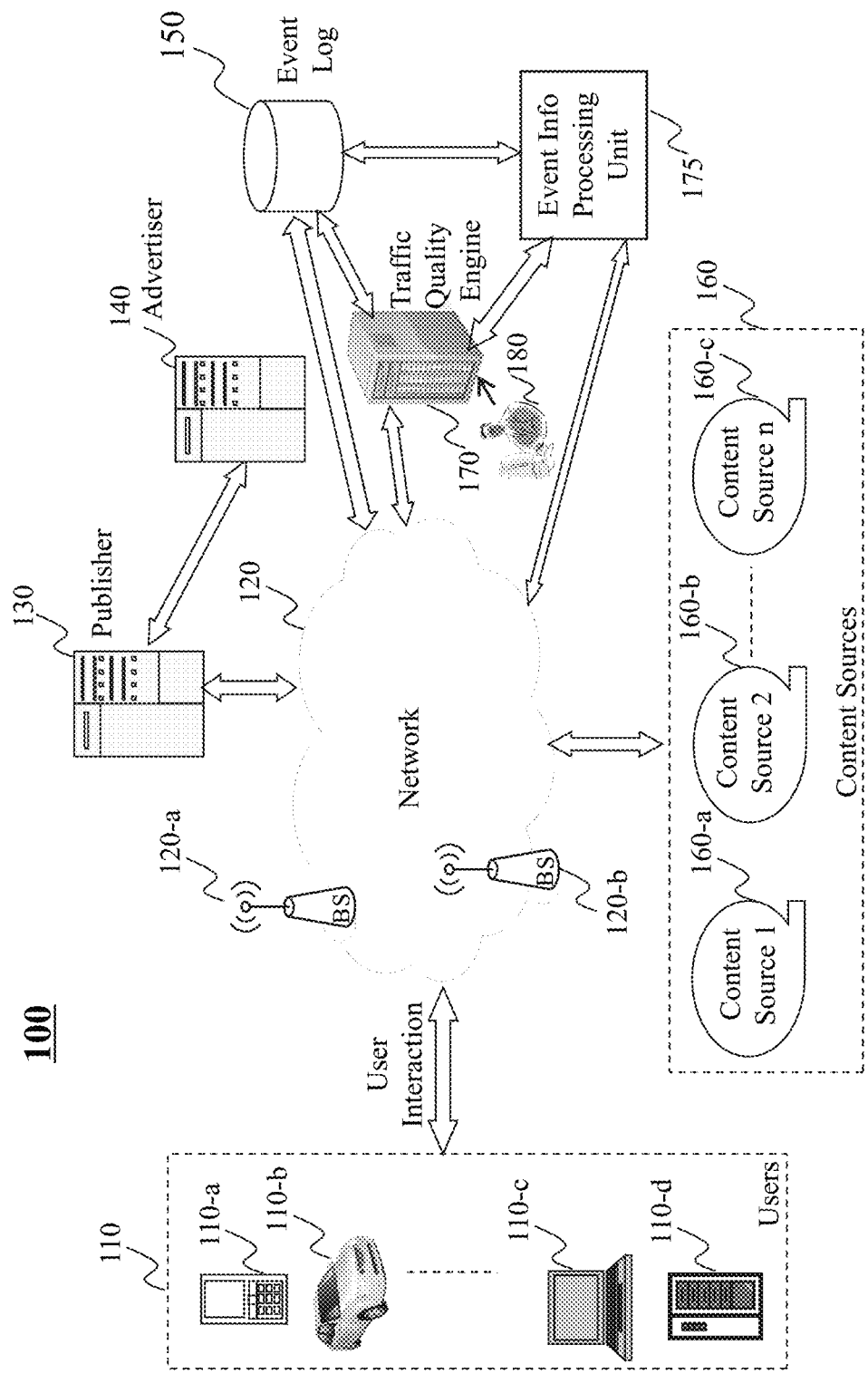

FIGS. 1(a)-1(c) are high level depiction of different system configurations in which feature sets for user events related to online advertising and event-level traffic quality scores based on the feature sets may be determined, according to one or more embodiments of the present disclosure. In FIG. 1(a), the exemplary system 100 includes users 110, a network 120, one or more publisher portals or publishers 130, one or more advertisers 140, an event log/database 150, data sources 160 including data source 1 160-a, data source 2 160-*b*, . . . , data source n 160-*c*, a traffic quality engine 170, an event info processing module 175 and a system operator/administrator 180.

The network 120 may be a single network or a combination of different networks. For example, a network may be a local area network (LAN), a wide area network (WAN), a public network, a private network, a proprietary network, a Public Telephone Switched Network (PSTN), the Internet, a wireless network, a cellular network, a virtual network, or any combination thereof. A network may also include various network access points, e.g., wired or wireless access points such as base stations or Internet exchange points 120-*a*, . . . , 120-*b*, through which a data source may connect to the network in order to transmit information via the network. In one embodiment, the network 120 may be an online advertising network or an ad network, which connects advertisers 140 to publishers 130 or websites/mobile applications that want to host advertisements. A function of an ad network is aggregation of ad-space supply from publishers and matching it with advertiser demand. An ad network may be a television ad network, a print ad network, an online (Internet) ad network, or a mobile ad network.

Users 110 may be of different types such as users connected to the network via desktop connections (110-*d*), users connecting to the network via wireless connections such as through a laptop (110-*c*), a handheld device (110-*a*), or a built-in device in a motor vehicle (110-*b*). In one embodiment, user(s) 110 may be connected to the network and able to access and interact with online content (provided by the publishers) through wireless technologies and related operating systems and interfaces implemented within user-wearable devices (e.g., glasses, wrist watch, etc.). A user, e.g., 110-1, may send a request for online content to the publisher 130, via the network 120 and receive content as well as one or more advertisements (provided by the advertiser 140) through the network 120. When provided at a user interface (e.g., display) of the user device, the user 110-1 may click on or otherwise select the advertisements) to review and/or purchase the advertised product(s) or service(s). In the context of the present disclosure, such ad presentation/impression, ad clicking, ad conversion, and other user interactions with the online content may be considered as an "event."

Publishers 130, may correspond to an entity, whether an individual, a firm, or an organization, having publishing business, such as a television station, a newspaper issuer, a web page host, an online service provider, or a game server. For example, in connection to an online or mobile ad network, publishers 130 may be an organization such as USPTO.gov, a content provider such as CNN.com and Yahoo.com, or a content-feed source such as Twitter or blogs. In one embodiment, publishers 130 include entities that develop, support and/or provide online content via mobile applications (e.g., installed on smartphones, tablet devices, etc.). In one example, the content sent to user 110-1 may be generated or formatted by the publisher 130 based on data provided by or retrieved from the content sources 160. A content source may correspond to an entity where the content was originally generated and/or stored. For example, a novel may be originally printed in a magazine, but then posted online at a web site controlled by a publisher. The content sources 160 in the exemplary networked environment 100 include multiple content sources 160-1, 160-2 . . . 160-3.

Advertisers 140, generally, may correspond to an entity, whether an individual, a firm, or an organization, doing or planning to do (or otherwise involved in) advertising business. As such, an advertiser 140 may be an entity that provides product(s) and/or service(s), and itself handles the advertising process for its own products) and/or service(s) at a platform (e.g., websites, mobile applications, etc.) provided by a publisher. For example, advertisers 14 may include companies like General Motors, Best Buy, or Disney. In some other cases, however, an advertiser 140 may be an entity that only handles the advertising process for products) and/or service(s) provided by another entity.

Advertisers 140 may be entities that are arranged to provide online advertisements to publisher(s) 130, such that those advertisements are presented to the user 110 with other online content at the user device. Advertisers 140 may provide streaming content, static content, and sponsored content. Advertising content may be placed at any location on a content page or application (e.g., mobile application), and may be presented both as part of a content stream as well as a standalone advertisement, placed strategically around or within the content stream. In some embodiments, advertisers 140 may include or may be configured as an ad exchange engine that serves as a platform for buying one or more advertisement opportunities made available by a publisher (e.g., publisher 130). The ad exchange engine may run an internal bidding among multiple advertisers associated with the engine, and submit a suitable bid to the publisher, after receiving and in response to a bid request from the publisher.

The content sources 160 may include multiple content sources 160-*a*, 160-*b*, . . . , 160-*c*. A content source may correspond to a web page host corresponding to a publisher (e.g., publisher 130) an entity, whether an individual, a business, or an organization such as USPTO.gov, a content provider such as CNN.com and Yahoo.com, or content feed source such as Twitter or blogs. Content sources 110 may be any source of online content such as online news, published papers, blogs, on-line tabloids, magazines, audio content, image content, and video content. It may be content from a content provider such as Yahoo! Finance, Yahoo! Sports, CNN, and ESPN. It may be multi-media content or text or any other form of content comprised of website content, social media content, such as Facebook, Twitter, Reddit, etc., or any other content rich provider. It may be licensed content from providers such as AP and Reuters. It may also be content crawled and indexed from various sources on the Internet. Content sources 110 provide a vast array of content to publishers 130 and/or other parts of system 100.

Traffic quality engine 170 may be configured to receive or retrieve, e.g., at a communication platform implemented therein, data related to a current user event indicating user interaction (impression, click, etc.) with online content and advertisement(s), e.g., from module 175 as well as data related to past user events, e.g., from event log 150, and process such event data to generate a feature value set that indicates diversity in user traffic or activity across the various entities of the online ad system 100. Further, based at least on the feature value set, engine 170 may generate an event-level traffic quality score for the current user event, which has a finer granularity than, e.g., determining the event as merely valid or invalid.

Event info processing module 175 may be configured to operate as a backend system of publisher 130 and advertiser 140 to receive, process and store information about user events related to user interaction (e.g., ad impression, ad click, ad conversion, etc.) with the online content including advertisements provided to users 110 at their devices. In some embodiments, after the user 110 performs an interaction (e.g., ad click) with the presented online content (i.e., the "current user event"), the related publisher 130 and/or the advertiser 140 (that provided the content and advertisement) may communicate the details of the current user event including, but not limited to, type of the event, time of the event, contextual information regarding the content and advertisement (e.g., whether it relates to sports, news, travel, retail shopping, etc.) related to the current event, user's information (such as user's IP address, name, age, sex, location, other user identification information), identification information of the publisher(s) 130 related to this particular event, identification information of the advertiser(s) 140 related to this particular event, and identification information of other entities/participants (e.g., ad creative(s)) related to this particular event. The foregoing event-related information may be provided to module 175 upon occurrence of each event for each user 110, each publisher 130 and each advertiser 140. In some other cases, such information is processed and recorded by module 175 only for a specific set of users 110, publishers 130 and/or advertisers 140. In some embodiments, module 175 may include a database (not shown) to store, in a specific category(-ies) and format(s), information related to users 110, publishers 130 and advertisers 140 and other entities of system 100. Further, module 175 may be configured to update its database (periodically, or on demand), with the latest information about the entities related to system 100, e.g., as and when publishers 130, advertisers 140, etc. join or leave the system 100.

Module 175 may define each of various entities of system 100 as an entity of a specific "type," e.g., users 110 as "User" entity, publishers 130 as "Publisher" entity, advertisers 140 as "Advertiser" entity, etc. Module 175 may further categorize users 110, publishers 130, advertisers 140, etc. into multiple (hierarchical or non-hierarchical) subsets within their respective assigned type. For example, module 175 may define or label users 110 in User category as belonging to different subcategories based on, e.g., their age, location, sex, IP address, etc., and accordingly sort and store that information in its database. Similarly, module 175 may define or label publishers 130 and advertisers 140 (in Publisher and Advertiser categories, respectively) as belonging to respective different subcategories based on, e.g., the type of content/advertisement that provide, their financial standing, etc., and accordingly sort and store that information. Processing module 175 provides the current user event data and data to engine 170 for determining feature set and traffic quality score, as will be described in detail below.

In some embodiments, the event log/database 150, which may be centralized or distributed, stores and provides data related to past user events (i.e., events that occurred previously in time with respect to the time of occurrence of the current user event) generated in accordance with or as a result of user interactions with online content and advertisements. Like current user event data discussed above, the past user event data may also include information regarding entities (e.g., user(s), publisher(s), advertiser(s), ad creative(s), etc.) associated with each respective past user event, and other event-related information. In some embodiments, after each current user event is processed by engine 170, module 175 may send the current event data (processed and stored therein) to database 150 to be added to, and thus update, the past user event data for use in processing future user events (that occur after the current user event). Additionally, upon processing of a current user event, engine 170 may also send data to event log/database 150, the data including, but not limited to, feature value set(s), probabilistic values related to the feature value set(s), traffic quality score(s), etc. that are generated or determined during processing of the current user event data by engine 170. As will be described later, engine 170 may receive or retrieve data related to past user events from database 150 to calculate an event-level traffic quality score for a current user event.

In addition to a user at 110, a different type of user such as 180, which may be a system operator or an administrator, may also be able to interact with different components of system 100, e.g., traffic quality engine 170, etc. for different administrative jobs such as managing the event log database 150, event info-processing module 175, etc. In some embodiments, user 180 may be classified to have a higher privilege to manage event log database 150 and/or event info-processing module 175 on more operational issues than user 110. For example, user 180 may be configured to be able to update the indexing scheme or format of data stored in the event log database, the format of data collected using module 175, or testing traffic quality engine 170. In some embodiments, traffic quality engine 170 and the related event log database 150 may be part of a third party service provider so that the publishers 130, advertisers 140 and user 180 may be customers of traffic quality engine 170. In this case, user 180 may configure separate data/process so that the service to different customers may be based on different data/process operational parameters to provide individualized services.

FIG. 1(*b*) presents a similar system configuration as what is shown in FIG. 1(*a*) except that the advertisers 140 are now configured as a backend sub-system of the publishers 130. In some embodiments, as shown in FIG. 1(*c*), there may be yet another different system configuration in which the administrator user 180 may solely manage traffic quality engine 170 and the event log 150 via an internal or proprietary network connection (not shown). It is noted that different configurations as illustrated in FIGS. 1(*a*)-1(*c*) may also be mixed in any manner that is appropriate for a particular application scenario.

Figure 2:
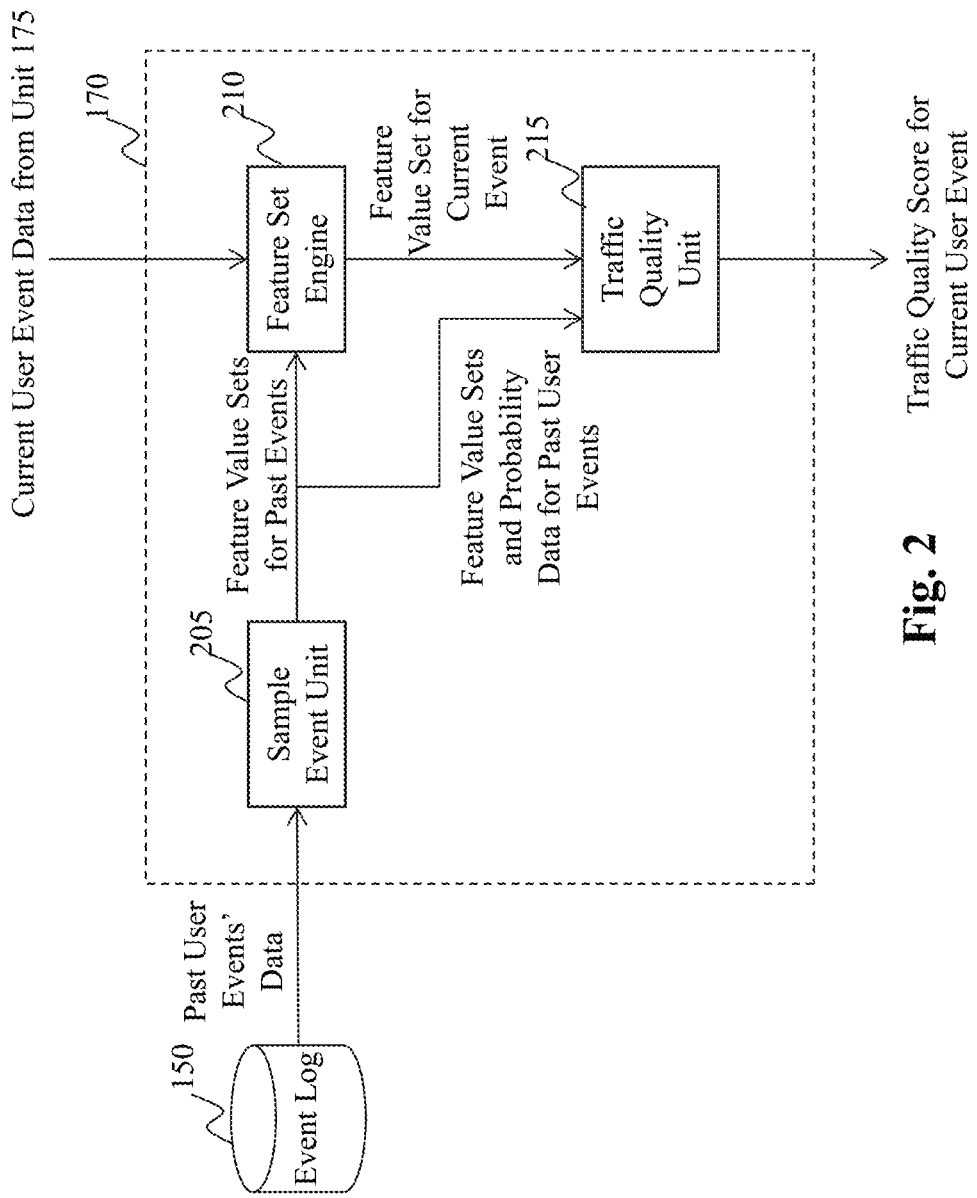
FIG. 2 is a high level depiction of an exemplary traffic quality engine, according to an embodiment of the present disclosure.

FIG. 2 is a high level depiction of an exemplary traffic quality engine 170, according to an embodiment of the present disclosure. As shown, traffic quality engine 170 includes a sample event unit 205, a feature set engine 210, and a traffic quality unit 215. Traffic quality engine 170 may receive data, e.g., at sample event unit 205, related to a current user event indicating user interaction (impression, click, etc.) with online content and advertisement(s) from module 175 as well as data related to past user events from event log 150, and process such event data, e.g., at feature set engine 210, to generate a feature value set for the current user event. Further, based at least on the feature value set and past user event data, traffic quality unit 215 may generate an event-level traffic quality score for the current user event, which may be used a basis to determine entity-level traffic quality score for each entity related to the current user event.

Figure 3:
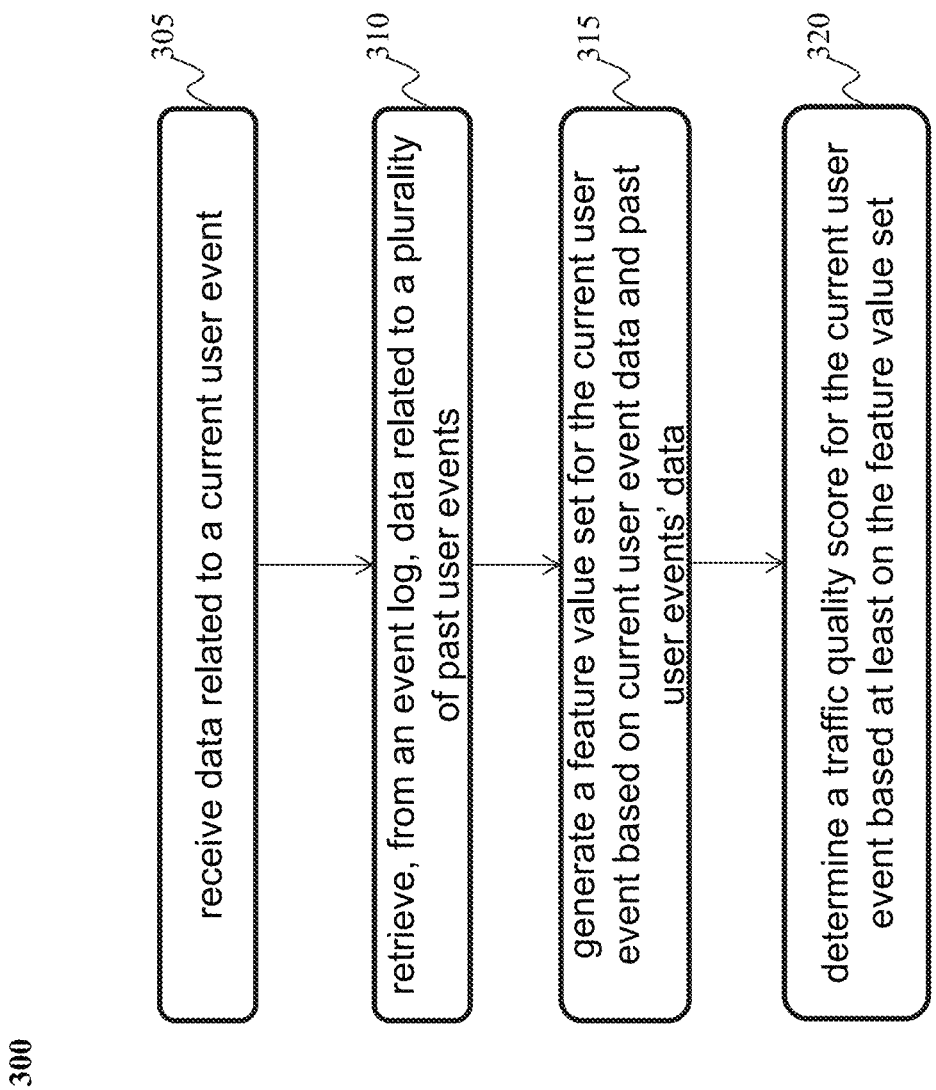
FIG. 3 is a flowchart of an exemplary process operated at the traffic quality engine, according to an embodiment of the present disclosure.

FIG. 3 is a flowchart of an exemplary process 300 operated at traffic quality engine 170, according to an embodiment of the present disclosure. At 305, data related to the current user event (e.g., information regarding the entities involved in the current event, etc.) are received at sample event unit 205 and/or at a communication platform/receiver from module 175. At 310, data related to the past user events (e.g., information regarding the entities involved in each past user event, etc.) are received at sample event unit 205 and/or at a communication platform/receiver from log 150. At 315, the received current and past event data are processed by feature set engine 210 to generate a feature value set for the current user event (which measures traffic diversity across multiple entity dimensions). At 320, based at least on the feature value set and past user event data, an event-level traffic quality score is generated for the current user event by traffic quality unit 215.

Figure 4A:
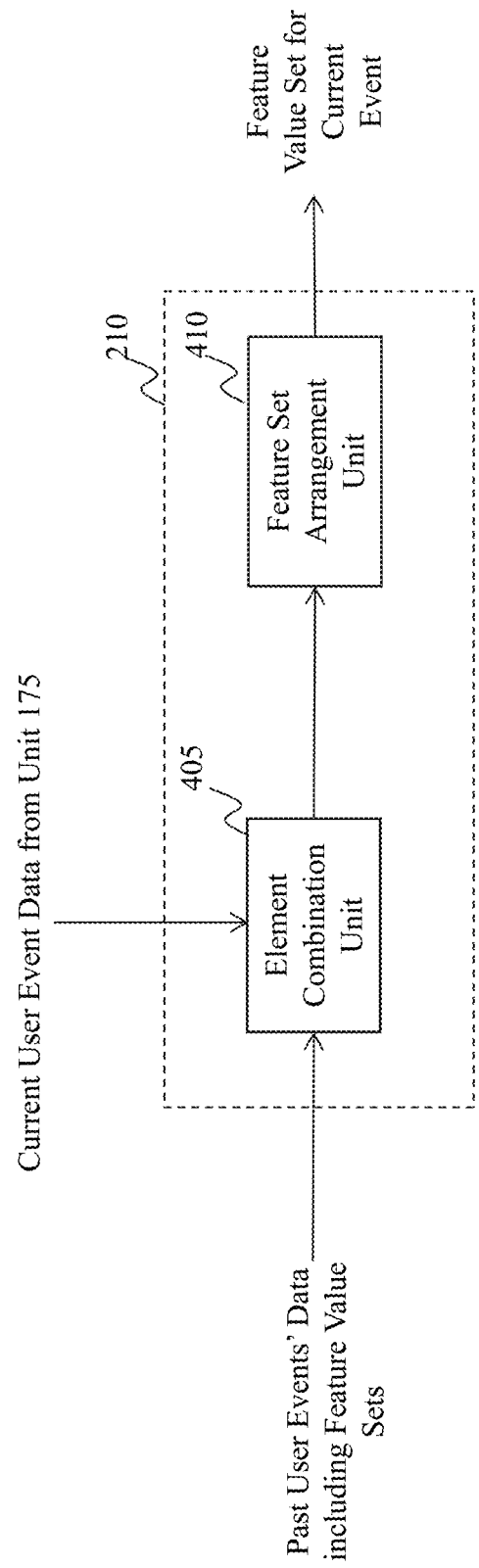
FIG. 4(a) is a high level depiction of an exemplary feature set engine, according to a first embodiment of the present disclosure.

FIG. 4(a) is a high level depiction of an exemplary feature set engine 210, according to a first embodiment of the present disclosure. As shown, feature set engine 210 may include an element combination unit 405 and a feature set arrangement unit 410. The element combination unit 405 may receive data related to past user events from sample event unit 205 (received from event log 150). The past user event data may include feature value sets for each of a specific number of the past user events (e.g., n past events) previously computed at feature set engine 210 for the past events and stored at event log 150. The feature value sets (for the current event and past events) each may be a set of real number or integer values with cardinality equal to m×(m−1), where m is the number of different types of entities. For example, if for the exemplary system 100, we consider three types of entities—User, Publisher and Advertiser—then the cardinality of a feature value set (for a current event or past event) is 3×(3−1)=6, i.e., the feature value set will have a total of six values. In addition to the past user event data, element combination unit 405 also receives data about the current user event (e.g., information about the specific entities related to the current user event, etc.) from event info-processing module 175.

Based on the current and past user event data, the element combination unit 405 may be configured to calculate, for each element of the feature value set for the current user event, a weighted combination value of corresponding elements in the feature value sets of the past user events. For example, for a current user event denoted as $r_i$ (where i denotes a time index or slot for the current event), the to-be-determined feature values of $r_i$ are denoted as $x_i(j)$, where j=1, 2, . . . , (m×(m−1)) is the index for features in the feature set, $x_i$. Accordingly, the n past user events for which the data (including feature value sets) are received at element combination unit 405 are denoted as $r_{i-1}, r_{i-2}, \ldots, r_{i-n}$, and their respective feature value sets are denoted as $x_{i-1}, x_{i-2}, \ldots, x_{i-n}$, each including m×(m−1) feature values. In one embodiment, element combination unit 405 calculates each $j^{th}$ feature value, $x_i(j)$ for the current user event, $r_i$, based on a weighted combination of corresponding $j^{th}$ feature values of the feature value sets of the past user events. Specifically, element combination unit 405 calculates each $j^{th}$ feature value, $x_i(j)$ for the current user event, $r_i$, by computing (e.g., using a hardware processor) the following (linear) mathematical expression/equation:

$$x_i(j) = \sum_{k=0}^{n} w_{i-k}(j) x_{i-k}(j) \quad (1)$$

where, $w_{i-k}(j)$ denotes the weight value used for the $j^{th}$ feature value of the feature value set of the $(i-k)^{th}$ user event, and is computed (e.g., also by unit 405) based on the following equation (2):

$$w_{i-k}(j) = e^{\frac{-k^2}{2\tau^2}} \quad (2)$$

where τ is the attenuation factor to control the speed of attenuation of the weight value.

Element combination unit 405 then provides the computed features values $x_i(j)$ for the current user event, $r_i$ to feature set arrangement unit 410 that arranges and/or formats those feature values as one set and stores the complete feature value set, $x_i$ in a memory or storage operatively associated with feature set engine 210 and/or traffic quality engine 170. Further, unit 410 may also provide the feature value set, $x_1$ to traffic quality unit 215 for traffic quality score calculation.

Figure 4B:
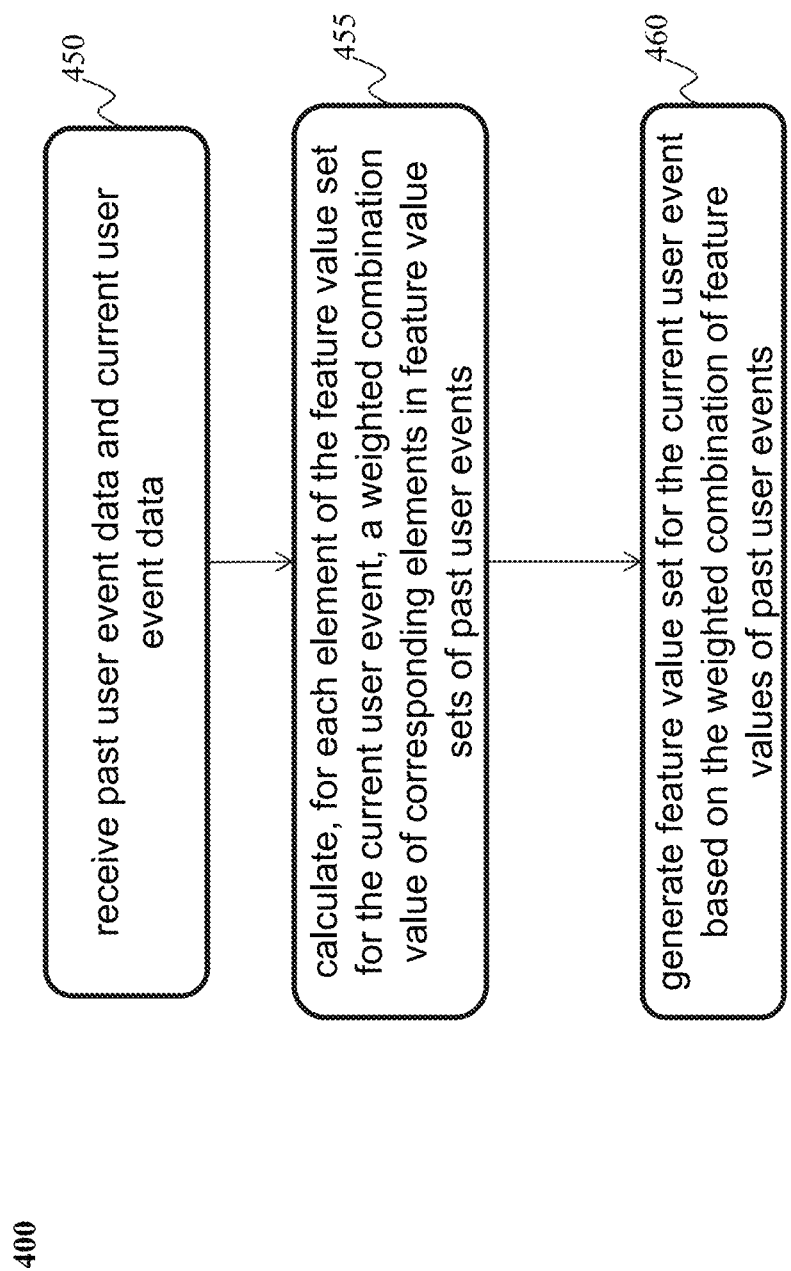
FIG. 4(b) is a flowchart of an exemplary process operated at the feature set engine, according to the embodiment described above with respect to FIG. 4(a)

FIG. 4(b) is a flowchart of an exemplary process 400 operated at feature set engine 210, according to the embodiment described above with respect to FIG. 4(a). At 450, data related to past user events are received from sample event unit 205 as well as information related to the current user event is received at element combination unit 405. The past user event data may include feature value sets for each of a specific number of the past user events (e.g., n past events) previously computed at feature set engine 210 for the past events and stored at event log 150. At 455, based on the current and past user event data, for each element of the feature value set for the current user event, a weighted combination value of corresponding elements in the feature value sets of the past user events may be computed, e.g., by unit 405 based on equations (1) and (2) above. At 460, the computed feature values for the current user event may be arranged and/or formatted as a single set, and stored in an associated memory or storage, and provided to traffic quality unit 215 for further processing related to traffic quality scored determination.

Figure 5A:
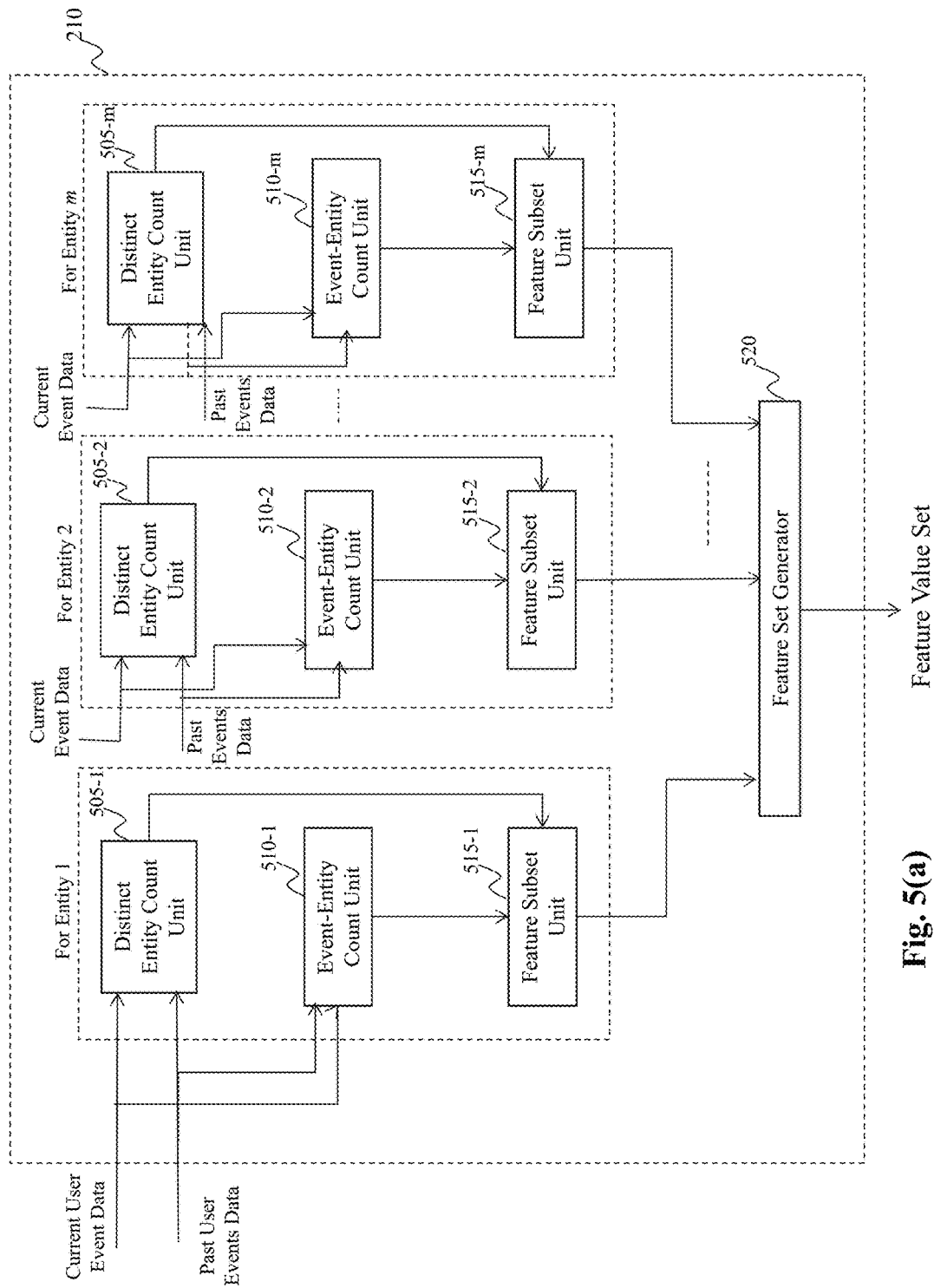
FIG. 5(a) is a high level depiction of an exemplary feature set engine, according to a second embodiment of the present disclosure.

FIG. 5(a) is a high level depiction of an exemplary feature set engine 210, according to a second embodiment of the present disclosure. As shown, feature set engine 210 may include distinct entity count (DEC) units 505, event-entity count (EEC) units 510, feature subset (FS) units 515 and a feature set arrangement unit 520. In this embodiment, the feature value set of a current user event is a combination of feature value subsets of each specific entity (e.g., user 110, publisher 130, advertiser 140) that is associated with the current user event. For example, in this embodiment, first, a feature value subset of each of one or more entities associated with the current user event is computed (e.g., based on current and past user events data and using respective DEC unit 505, EEC unit 510 and FS unit 515), and then, based on those feature value subsets, the complete feature value set of the current user event is determined using unit 520.

Accordingly, feature set engine 210 may include a set of DEC unit 505, EEC unit 510 and FS unit 515 corresponding to each of m entities associated with the current user event. For simplicity, it is assumed here that the current user event is related to only one entity of each of the m different types of entities, and thus, is related to a total of m entities, but this assumption is not limiting or construed as such, in the context of this disclosure.

In operation, each DEC unit 505 and EEC unit 510 may receive data related to past user events from sample event unit 205 (that received data from event log 150). The past user event data may include feature value sets for each of a specific number of the past user events (e.g., n past events) previously computed at feature set engine 210 for the past events and stored at event log 150. As discussed above, the feature value sets (for the current event and past events) each may be a set of real number or integer values with cardinality equal to m×(m−1), where m is the number of different types of entities. For example, if for the exemplary system 100, we consider three types of entities—User, Publisher and Advertiser—then the cardinality of a feature value set (for a current event or past event) is 3×(3−1)=6, i.e., the feature value set will have a total of six values. In addition to the past user event data, DEC units 505 and EEC units 510 also receive data about the current user event (e.g., information about the specific entities related to the current user event, etc.) from event info-processing module 175.

Based on the received data, let $S=\{r_1, r_2, \ldots, r_n\}$ be the set of all past user events (recorded for a specific time period, e.g., one week), and $E_k=\{e_{k,j}\}_{j=1}^{m_k}$ be the entity set of entity type k, and $m_k$ is the total number of entities of type k. Further, $S(e_{k,j})$, the set of all events that contain or are associated with a specific entity $e_{k,j}$, is defined as $S(e_{k,j})=\{r_i|r_{i,k}=e_{k,j}, i=1, \ldots, n\}$, where $r_{i,k}$ is the projection of $r_i$ on entity set $E_k$. In some embodiments, for an entity $e_{k,j}$ (i.e., $j^{th}$ entity of type k) associated with the current user event, DEC unit 505-k may determine the distinct number of entities of type k', where k'≠k in the set $S(e_{k,j})$. Specifically, DEC unit 505-k may compute:

$$l_{k'}(e_{k,j}) = \text{distinct\_count } \{r_{i,k'}|r_i \in S(e_{k,j})\}, k' \neq k \quad (3)$$

Similar determinations of distinct entity count are performed at each of DEC units 505, and the distinct entity counts for each entity are provided to corresponding FS unit 515.

Further, in some embodiments, for the entity $e_{k,j}$ associated with the current user event, EEC unit 510-k may determine the total number of past recorded events, $n(e_{k,j})$, in which the entity $e_{k,j}$ is a participant. That is, EEC unit 510-k may compute:

$$n(e_{k,j}) = |S(e_{k,j})| \quad (4)$$

Similar determinations of entity-event count are performed at each of EEC units 510, and the entity-event counts for each entity are provided to the corresponding FS unit 515.

Based on the distinct entity count and entity-event count, each FS unit 515 may compute a feature subset of the corresponding entity (out of m entities related to the current user event). Specifically, for entity $e_{k,j}$, FS unit 515-k may determine the feature subset as:

$$f(e_{k,j}) = \left( \frac{l_1(e_{k,j})}{n(e_{i,j})}, \ldots, \frac{l_{k-1}(e_{k,j})}{n(e_{k,j})}, \frac{l_{k+1}(e_{k,j})}{n(e_{k,j})}, \ldots, \frac{l_m(e_{k,j})}{n(e_{k,j})} \right) \quad (5)$$

where the ratios in equation (5) are computed based on values provided by the DEC and EEC units using equations (3) and (4).

Further, each FS unit 515-k may provide the entity-specific feature subset (from equation (5)) to the feature set arrangement unit 520 that is configured to determine the complete feature value set $x_1$ for the current user event $r_i$. Specifically, unit 520 arranges the feature subsets for the entities as in equation (6) below to obtain the feature value set of the current user event:

$$x_i = (f(r_{i,1}), f(r_{i,2}), \ldots, f(r_{i,m})) \in R^{m(m-1)} \quad (6)$$

Feature set arrangement unit 520 may provide the feature value set to traffic quality unit 215 for further processing related to traffic quality scored determination.

Because this feature value set includes features for each associated entity (of each type), the feature value set presents a measurement of traffic diversity across most or all of the different types of entities of the system 100 that may be involved in a user event. From advertisers' perspective, not only do they want to reach people as many as possible (measured as traffic volume), but also they want to reach as much broad and distinct user base as possible (e.g., based on different user IDs, IP addresses, etc. As such, traffic volume and breadth are two important factors of consideration for advertisers to determine if their advertisements or advertisement strategies are effective or not. For example, it may not be effective or efficient for advertisers, if a large amount of traffic is observed, but from only a small number of distinct users. In fact, some advertisers may require to be charged by the publishers based on the number distinct users (based on IP addresses, etc.) rather than the total number of users they reach. To that end, the traffic divergence features in a feature value may offer some benefits. First, the feature value set takes into consideration both volume of traffic and breadth of distinct users. Second, it is extendable and flexible, as the total number of entities or the types of entities change in the system 100, the value or contents of the feature value set may be generated and used for score determination accordingly (e.g., more features may be obtained by adding more entities for computing by feature set engine 210). Finally, because for each entity, a separate set of DEC unit, EEC unit 510 and FS unit 515 may be implemented and used, the overall operation of feature set engine 210 may be implemented in accordance with the principles of parallel-processing for faster execution.

Figure 5B:
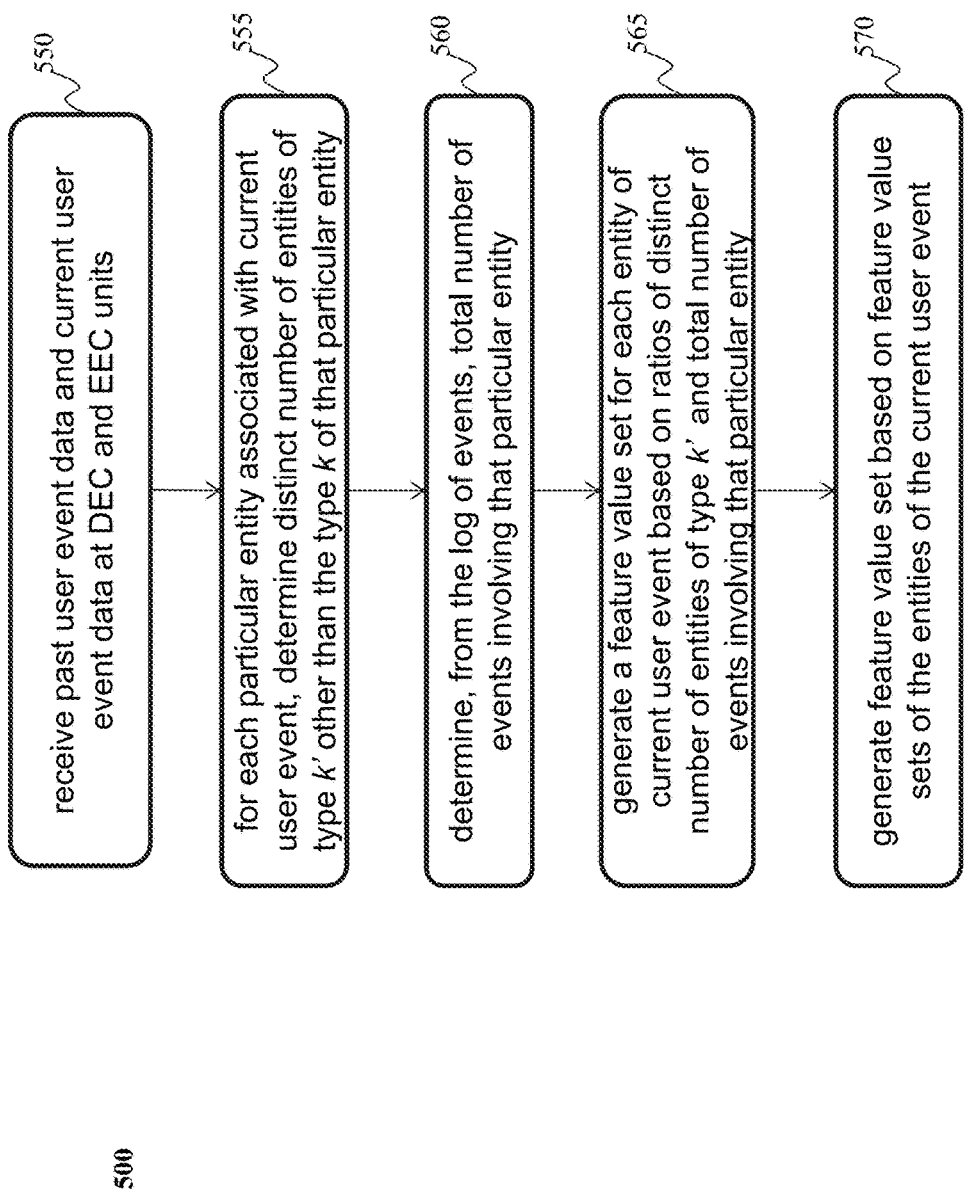
FIG. 5(b) is a flowchart of an exemplary process operated at the feature set engine, according to the embodiment described above with respect to FIG. 5(a)

FIG. 5(b) is a flowchart of an exemplary process 500 operated at feature set engine 210, according to the embodiment described above with respect to FIG. 5(a). At 550, data related to past user events are received from sample event unit 205 as well as information related to the current user event is received at DEC units 505 and EEC units 510. The past user event data may include feature value sets for each of a specific number of the past user events (e.g., n past events) previously computed at feature set engine 210 for the past events and stored at event log 150. At 555, based on the current and past user event data, for each entity associated with current user event, distinct number of entities k' may be determined by the corresponding DEC unit 505-k, e.g., based on equation (3). At 560, based on the current and past user event data, for each entity associated with current user event, the total number of past recorded events, $n(e_{k,j})$, in which the entity $e_{k,j}$ is a participant are determined by the corresponding EEC unit 510-k, e.g., based on equation (4). Further, at 565, based on the distinct entity count (555) and entity-event count (560), each FS unit 515-k may compute a feature subset of the corresponding entity, e.g., based on equation (5). At 570, the entity-specific feature subsets (565) are provided to the feature set arrangement unit 520 and based on those subsets, the complete feature value set for the current user event is determined by arrangement in accordance with equation (6) performed by unit 520, and provided to traffic quality unit 215 for further processing related to traffic quality scored determination.

Figure 6A:
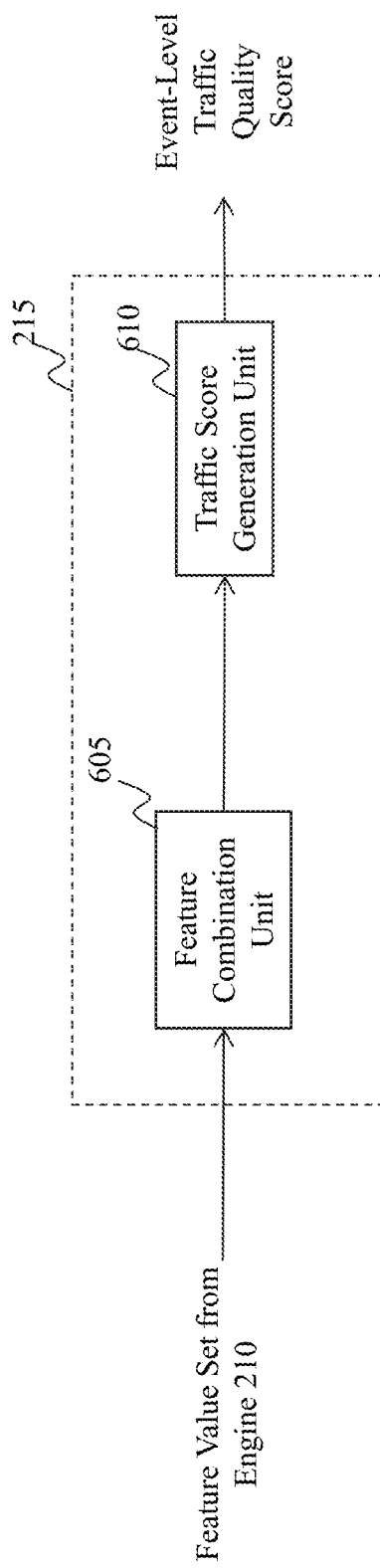
FIG. 6(a) is a high level depiction of an exemplary traffic quality unit (shown in FIG. 2), according to one embodiment of the present disclosure.

FIG. 6(a) is a high level depiction of an exemplary traffic quality unit 215 (shown in FIG. 2), according to one embodiment of the present disclosure. As shown, traffic quality unit 215 may include a feature combination (FC) unit 605 and a traffic score generation (TSG) unit 610. FC unit 605 may receive the feature value set for a current user event from feature set engine 210, and process the feature set based on a linear (or non-linear) model. For example, FC unit 605 may compute a weighted sum ("ws") of the feature values of the feature value set (which may include a total of, say, p values) of the current user event. Specifically, FC unit 605 may compute the weighted sum based on:

$$ws = \Sigma_{i=1}^{p} w_i x_i \quad (7)$$

where $w_i$ is the individual weight assigned to each feature value, and may be based on one or more of a number of factors, such as the type of event, type of entities associated with the event, etc., or may be preselected and preset by one or more of the entities of the system 100. In one embodiment, all the weight values w may be set equal to one, or logistic regression may be used to tune automatically. FC unit 605 may compute a plurality of weighted sums using equation (7) with different weight values, and provide these multiple weighted sums to TSG unit 610 for further processing to determine the event-level traffic quality score of the current user event.

In some embodiments, TSG unit 610 selects one of the multiple weighted sums provided by FC unit 605 as the event-level traffic quality score of the current user event, based on certain criteria, such as the type of event, type of entities associated with the event, total number of entities involved with the current user event, and/or other pre-defined information or dynamic system information. If, however, there is only one weighted sum value provided by FC unit 605, TSG unit 610 assigns that weighted sum value as the event-level traffic quality score.

Figure 6B:
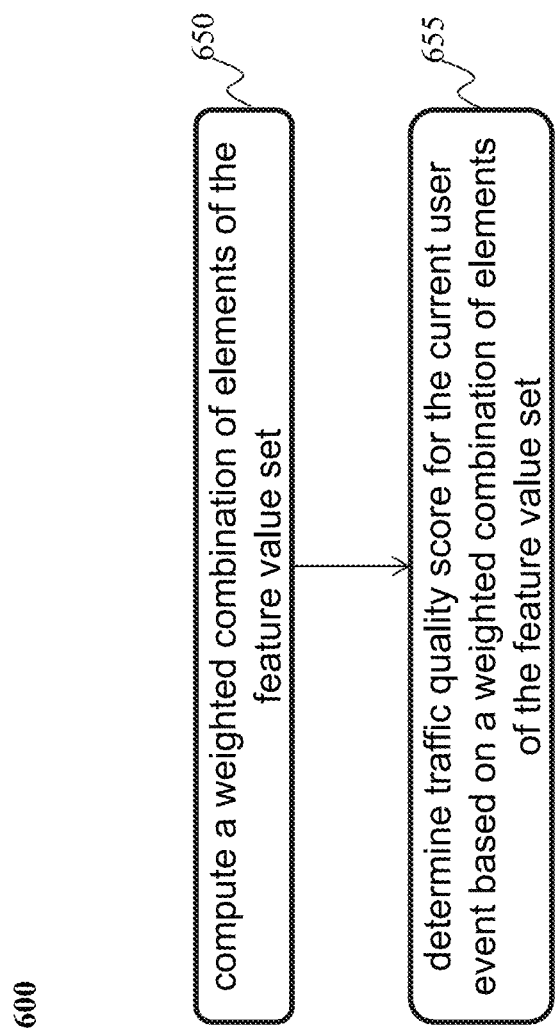
FIG. 6(b) is a flowchart of an exemplary process operated at the traffic quality unit, according to the embodiment described above with respect to FIG. 6(a)

FIG. 6(b) is a flowchart of an exemplary process 600 operated at traffic quality unit 215, according to the embodiment described above with respect to FIG. 6(a). At 650, the feature value set for a current user event may be received from feature set engine 210 at FC unit 605, and the feature set may be processed based on a linear (or non-linear) model. For example, FC unit 605 may compute a weighted sum of the values of the feature value set in accordance with equation (7) based on one or more sets of weight values. At 655, these one or more weighted sums are received at TSG unit 610 for, e.g., selection of one of the one or more weighted sums as the event-level traffic quality score of the current user event. Such selection may be based on certain criteria, such as the type of event, type of entities associated with the event, total number of entities involved with the current user event, and/or other pre-defined information or dynamic system information.

Figure 7A:
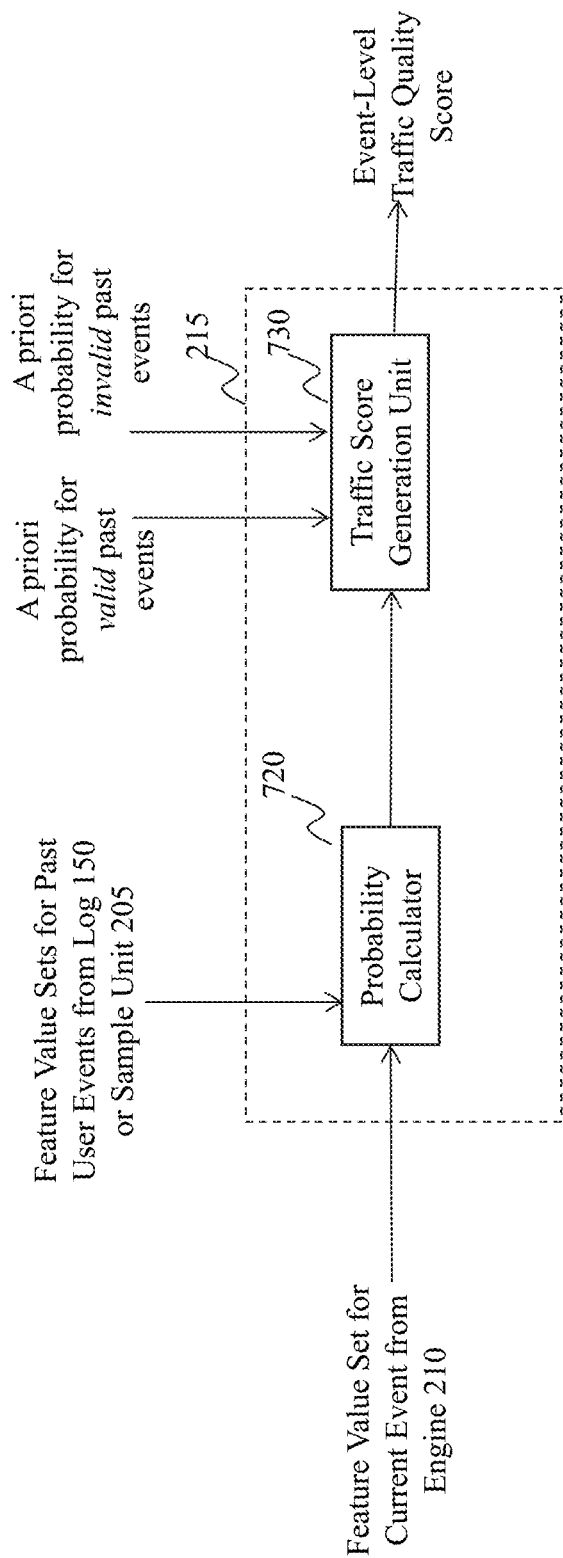
FIG. 7(a) is a high level depiction of an exemplary traffic quality unit (shown in FIG. 2), according to another embodiment of the present disclosure.

FIG. 7(a) is a high level depiction of an exemplary traffic quality unit 215 (shown in FIG. 2), according to another embodiment of the present disclosure. Traffic quality unit 215 may be implemented in accordance with a supervised machine-learning model, such as (but not limited to) logistic regression, Bayesian, support vector machine (SVM), which may be used to build classifiers to score each event. This non-limiting embodiment of traffic quality unit 215 may be implemented based on Naïve Bayesian model. As shown, traffic quality unit 215 may include a probability calculator 720 and a traffic score generation unit 730.

In some embodiments, the probability distribution of the feature values may not be known or assumed, since the feature values are usually not Gaussian distributed. Accordingly, with large amount of data, the feature values' histogram may be treated as probability, i.e., each feature value may be discretized into buckets and the occurrence frequency of each bucket value is calculated accordingly to determine probabilities related to the feature value set (used in the Naïve Bayesian model to calculate event score). As such, in operation, probability calculator 720 may receive feature value sets of the past user events (e.g., from sample unit 205 or directly from log 150) and the feature value set of the current user event (e.g., feature set engine 210). For example, probability calculator 720 may receive feature value sets of past n events, and the complete past feature set X may be expressed as $X = \{x_1, x_2, \ldots, x_n\}$, where $x_i = (x_{i,1}, x_{i,2}, \ldots, x_{i,c})$ is a feature set of the $i^{th}$ past user event and $x_{i,j}$ is its $j^{th}$ feature value. Probability calculator 720 may compute probability distribution (e.g., as histograms) of the feature value sets of the past user events, and (conditional) probability values of elements of the feature value set of the current user event based on the probability histogram of the feature value sets of the past user events.

In addition to the feature value sets, probability calculator 720 and/or traffic score generator 730 may receive a priori probabilities of the past user events being valid or invalid. Typically, most of anti-fraud systems in online advertising platform (e.g., system 100) have some simple rule filters, using which the events are marked as valid or invalid. As such, each of the past user events (data of which are used in various ways in the system 100 described herein) have been pre-identified as valid or invalid, e.g., applying a certain validity threshold to the respective event score of the past user events (which may have been computed by traffic quality engine 170 in the manner similar to the score determination of the current user event). If the event score of the past user event is smaller than the validity threshold, that past event may be considered as invalid, otherwise valid (or vice-versa). As such, the validity set Y is expressed as $Y = \{y_1, y_2, \ldots y_n\}$, in which $y_i = 0$ if the event $r_i$ is invalid and $y_i = 1$ if the event $r_i$ is valid. Based on the available valid/invalid markings for the n past user events, the probability of the past event being valid (i.e., P(y=1)) and being invalid (i.e., P(y=0)) may be computed using the validity set values Y (e.g., by traffic quality engine 170 or a module therein), and provided to probability calculator 720 and/or traffic score generation unit 730.

Traffic score generator 730 may generate the traffic quality score for the current user event based on the (conditional) probability values of elements of the feature value set of the current user event (from unit 720), and the apriori probability values for the past user events being valid (P(y=1)) and being invalid (P(y=0)). In one embodiment, in accordance with the Naïve Bayesian model, score generator 730 computes the score of the current event $r_{new}$ with feature value set $x_{new}$ with the set cardinality equal to d (from 210) as:

$$\text{score} = \log\left(\frac{P(y=1 \mid x_{new})}{P(y=0 \mid x_{new})}\right) \quad (8)$$

$$= \log\left(\frac{P(y=1)\prod_{j=1}^{d} P(x_{new,j} \mid y=1)}{P(y=0)\prod_{j=1}^{d} P(x_{new,j} \mid y=0)}\right)$$

$$= \log P(y=1) - \log P(y=0) +$$

$$\sum_{j=1}^{d}(\log P(x_{new,j} \mid y=1) - \log P(x_{new,j} \mid y=0))$$

Figure 7B:
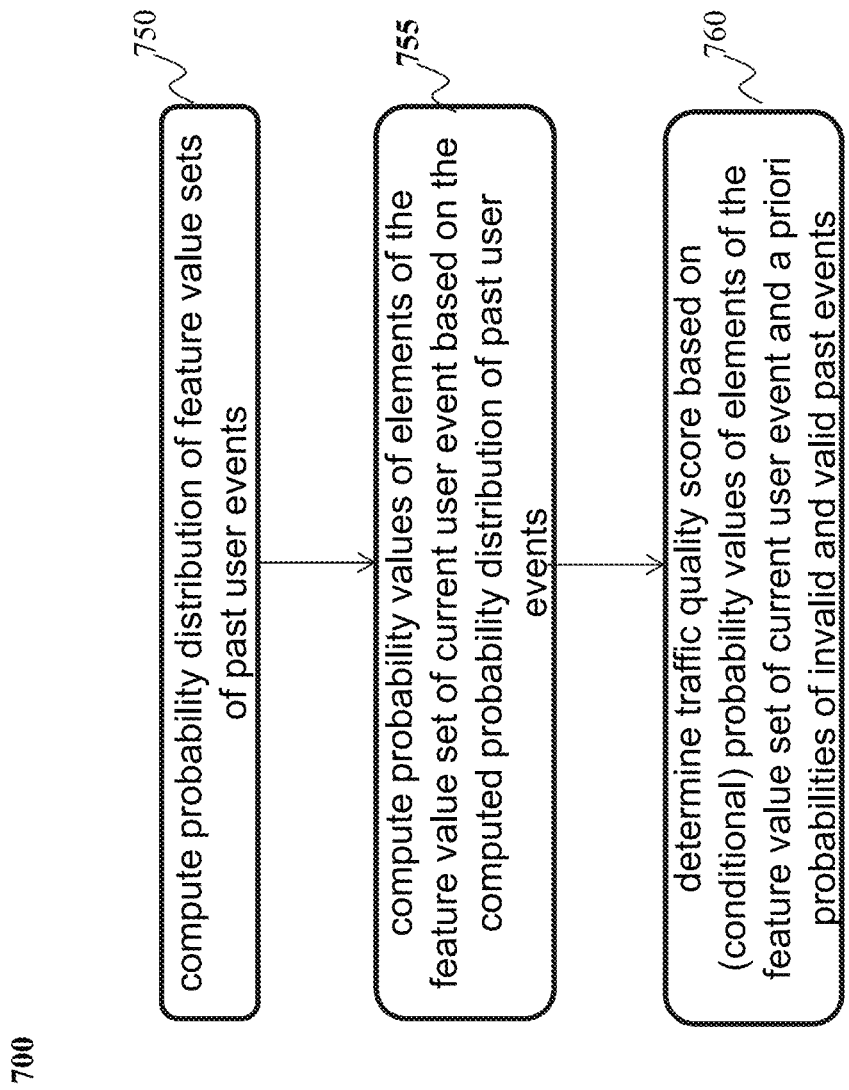
FIG. 7(b) is a flowchart of an exemplary process operated at the traffic quality unit, according to the embodiment described above with respect to FIG. 7(a)

FIG. 7(b) is a flowchart of an exemplary process 700 operated at traffic quality unit 215, according to the embodiment described above with respect to FIG. 7(a). At 750, probability distribution (e.g., as histograms) of the feature value sets of the past user events are computed by probability calculator 720. At 755, (conditional) probability values of elements of the feature value set of the current user event based on the probability histogram of the feature value sets of the past user events are computed by probability calculator 720. These probabilities may be computed based on the feature value sets of the past user events received at calculator 720 from sample unit 205 or directly from log 150, and the feature value set of the current user event received at calculator 720 from feature set engine 210.

At 760, the traffic quality score for the current user event may be generated at traffic score generator 730 based on the (conditional) probability values of elements of the feature value set of the current user event (from unit 720), and the apriori probability value for the past user events being valid and being invalid.

Figure 8A:
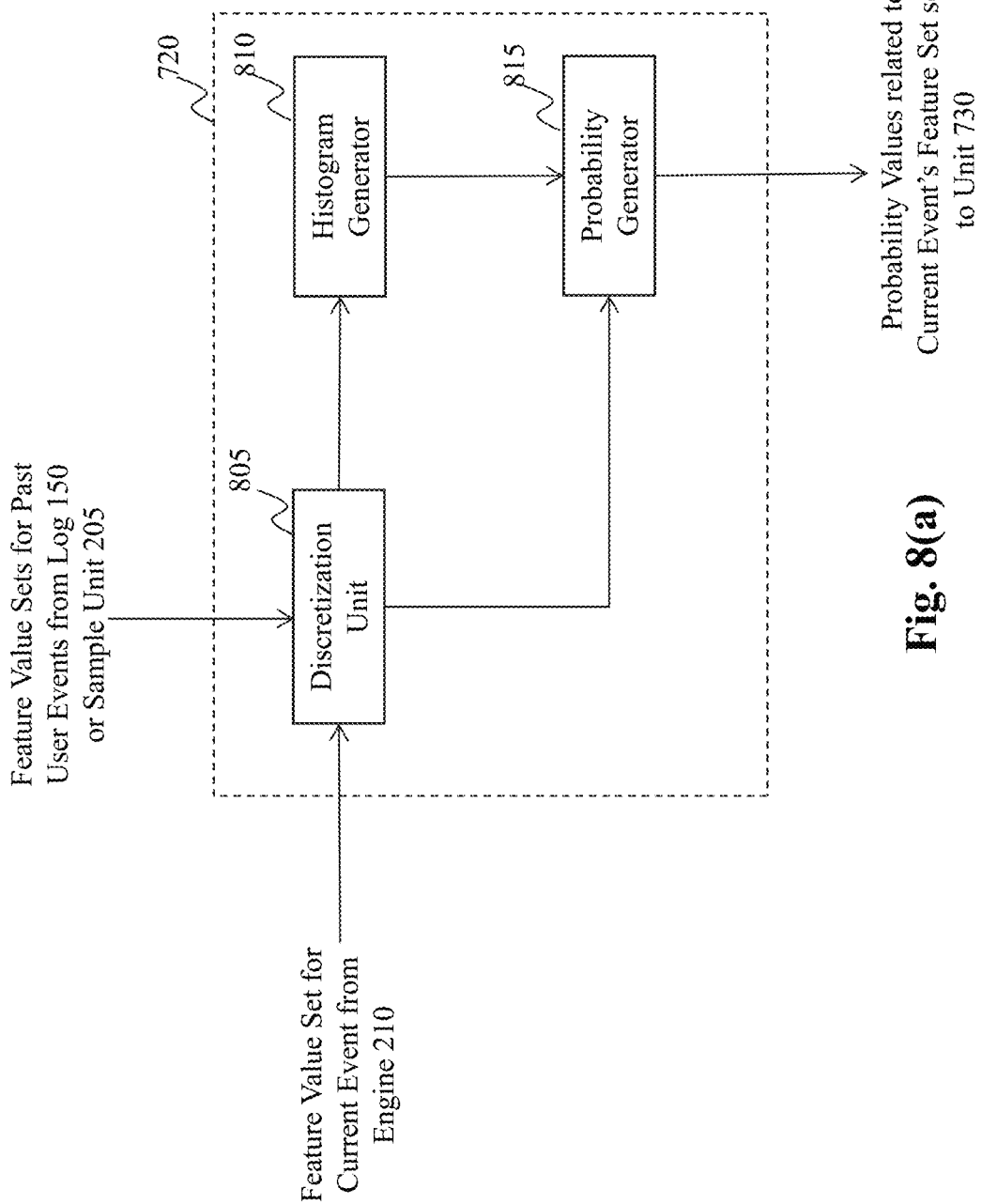
FIG. 8(a) is a high level depiction of an exemplary probability calculator (shown in FIG. 7(a)), according to an embodiment of the present disclosure.
Figure 8B:
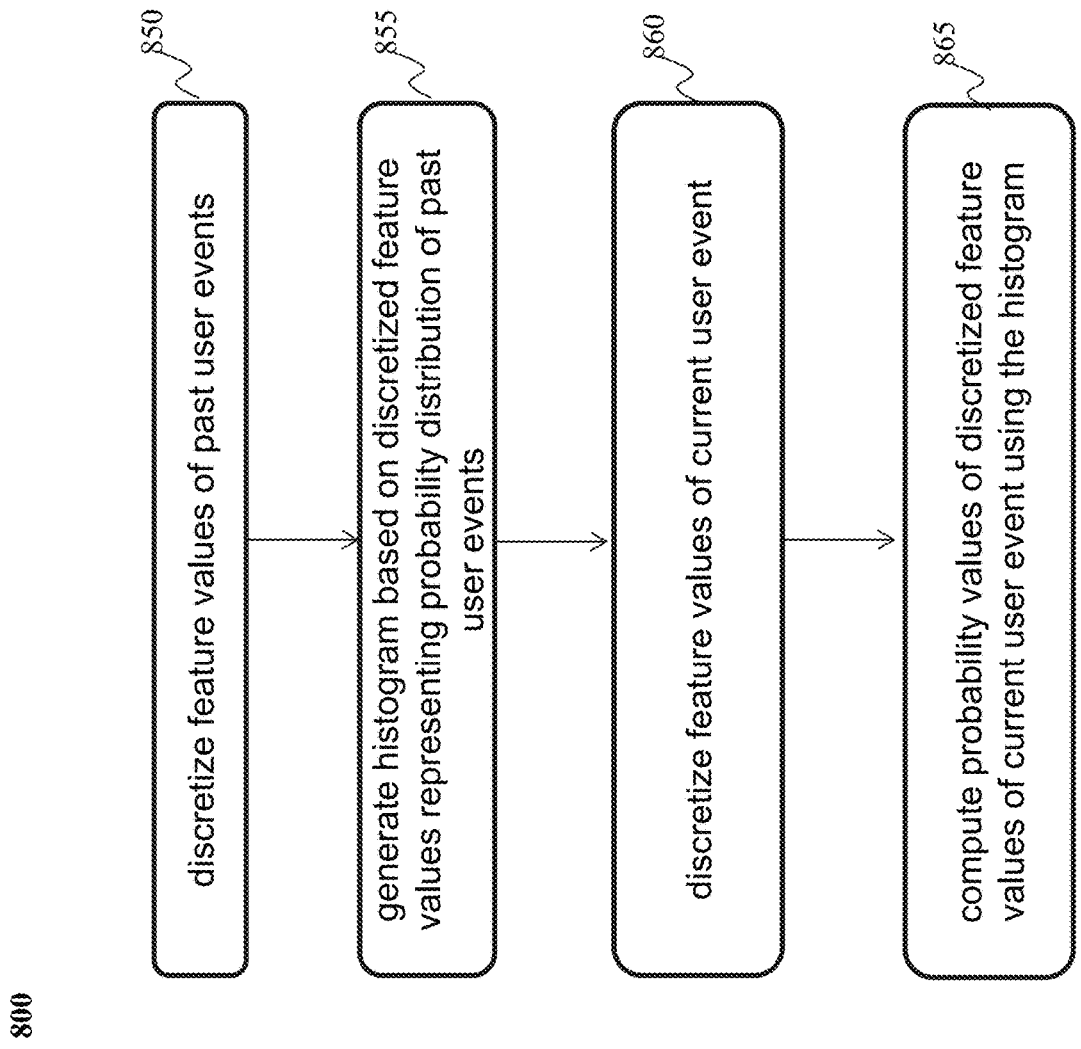
FIG. 8(b) is a flowchart of an exemplary process operated at the probability calculator, according to the embodiment described above with respect to FIG. 8(a)

FIG. 8(*a*) is a high level depiction of an exemplary probability calculator 720 (shown in FIG. 7(*a*)), according to an embodiment of the present disclosure. As shown, calculator 720 includes a discretization unit 805, a histogram generator 810, and a probability generator 815. Discretization unit 805 may discretize each feature value $x_i,j$ of the complete past feature set $X=\{x_1, x_2, \ldots, x_n\}$ for n past user events, where $x_i=(x_{i,1}, x_{i,2}, \ldots, x_{i,c})$ and also discretize the feature values $x_{new}$ of the current user event, in accordance with the following mathematical equation:

$$B^* \text{floor}\left(\frac{x_{i,j} - a_j}{b_j - a_j}\right) \quad (9)$$

where, B is the number of histogram buckets, and $$a_j = \min_{i \in \{1,\ldots,n\}} \{x_{i,j}\}, \quad b_j = \max_{i \in \{1,\ldots,n\}} \{x_{i,j}\}$$

are the minimum value and maximum value of the feature value $x_{i,j}$, respectively.

As discussed above, the probability distribution of the feature values may not be known or assumed, since the feature values are usually not Gaussian distributed. Accordingly, after discretizing the feature values (e.g., using 805, based on equation (9)), the feature values of the past user events may be represented in a histogram, and for (discrete) feature values of any new current user event, their related absolute or conditional probabilities (such as those required to determine event score using equation (8)) may be determined using the histogram. In that regard, histogram generator 810 may generate and store (in an associated memory) a feature value histogram using the discrete feature values obtained from discretization unit 805, and the histogram, along with the discrete feature values of the current user event, is fed to probability generator 815. Probability generator 815 may generate probabilities related to the feature values $x_{new}$ of the current user event to be provided to traffic score generator 730 to determine the event score (e.g., based on equation (8)). For example, let $x_q$ be the one of the feature value of the set $x_{new}$, and has been discretized. Suppose $x_q$ only has n distinct values, v1, v2, ..., vn, and frequencies of the above values as indicated by the histogram are $m_1, m_2, \ldots, mn$, then the probability of $x_q$ equal to $v_i$, determined by probability generator 815, is:

$$P(x_q=v_i)=m_i/\Sigma_{i=1}^n m_i \quad (10)$$

For conditional probabilities:

$$P(x_q|y=1)$$

and $$P(x_q|y=0),$$

probability generator 815 determines the probabilities using equation (10) in relation with (or under the condition of) the apriori probability values for the past user events being valid P(y=1), and being invalid P(y=0). These conditional probabilities are then provided to unit 730 to determine event score.

FIG. 8(*b*) is a flowchart of an exemplary process 800 operated at probability calculator 720, according to the embodiment described above with respect to FIG. 8(*a*). At 850, the feature values of the past user events are discretized using, e.g., discretization unit 805. At 855, using histogram generator 810, a feature value histogram based the discrete feature values (from unit 805) is generated (and stored). At 860, the feature values of the current user event are discretized using, e.g., discretization unit 805. At 865, based on the feature value histogram, probabilities related to the feature values $x_{new}$ of the current user event (that are to be provided to traffic score generator 730 to determine the event score) are generated at probability generator 815.

Figure 9A:
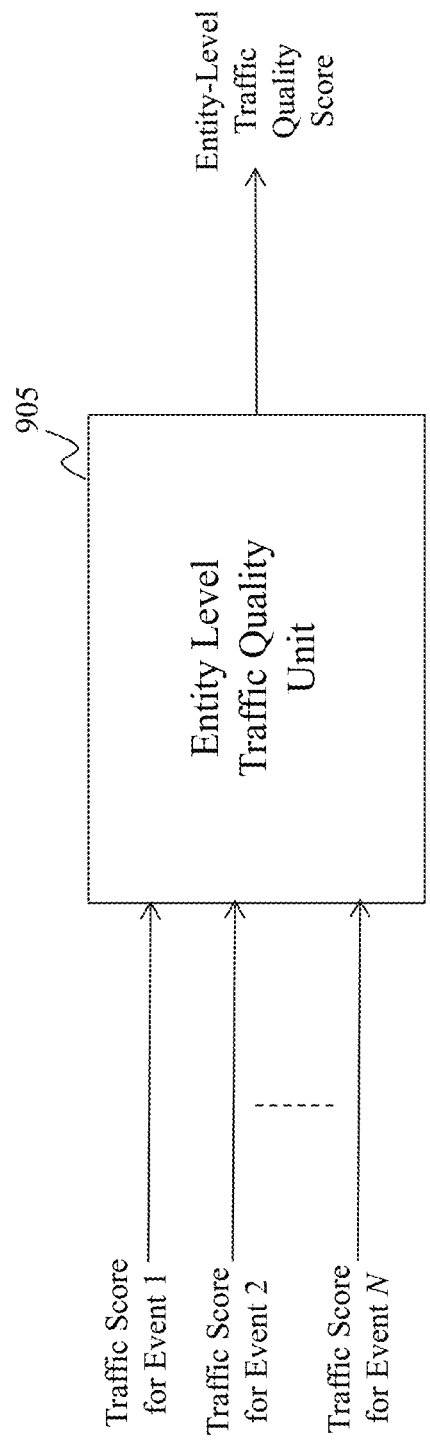
FIG. 9(a) is a high level depiction of an exemplary entity traffic quality unit, according to an embodiment of the present disclosure.

After obtaining the event-level traffic quality scores from the traffic quality 170 and various related modules (as discussed above), a traffic quality score for a particular entity (user 110, publisher 130, advertiser 140, etc.) may be desirable to identify effectiveness of an online advertisement strategy, to appropriately bill an advertiser or price advertisement opportunities at a publisher, to determine a targeted group of user(s) that responsive/unresponsive to a specific online advertisement strategy, etc. In other words, the traffic quality scores at the entity level may provide insight regarding the online advertisement activity as it relates to various different aspects (users, publishers, advertisers, etc.) of the system 100. Accordingly, in reference to FIGS. 1(*a*)-1(*c*), traffic quality engine 170 may include an entity traffic quality unit 905, a high level exemplary depiction of which, according to an embodiment of the present disclosure, is shown in FIG. 9(*a*). Entity traffic quality unit 905 may receive traffic quality scores of a plurality of current user events that involve a specific entity and that happened in a specific time period (e.g., one hour, one day, one week, etc.), compute a statistical measure of the traffic quality scores of those current user events, and generate an entity-traffic quality score for the specific entity based on the statistical measure.

For example, for a particular entity E, its related score may be treated as a random variable, e.g., with probability distribution as score, $x \sim N(\mu,\sigma^2)$. Entity traffic quality unit 905 may receive event scores $(x_1, x_2, x_3, \ldots, x_N)$ for a total of N events (recorded for a specific time period) related to the entity E. Entity traffic quality unit 905 may calculate an estimate of the real mean value of s, i.e. $\mu$, based on the event scores $(x_1, x_2, x_3, \ldots, x_N)$. In one embodiment, entity traffic quality unit 905 may use point estimation to determine the entity-level score of E as the mean value, $\mu$ of the event scores, e.g., based on the equation below:

$$\bar{x} = \sum_{i=1}^{N} x_i \quad (11)$$

However, the approach using equation (11) does not take the number N into consideration. For example, if N is very small, then the mean estimate may not be as accurate as expected. Accordingly, in another embodiment, entity traffic quality unit 905 computes an estimate of the mean value taking N into consideration. Specifically, unit 905 uses interval estimation instead of point estimation to get a confidence interval for $\bar{x}$ based on:

$$\left(\bar{x} - t_{\alpha/2}\frac{s}{\sqrt{N}}, \bar{x} + t_{\alpha/2}\frac{s}{\sqrt{N}}\right) \quad (12)$$

Where, s is computed by unit 905 as:

$$s = \sqrt{\frac{1}{N-1}\sum_{i=1}^{N}(x_i - \bar{x})^2} \quad (13)$$

and, the interval size is calculated as equal to:

$$2 * t_{\alpha/2} \frac{s}{\sqrt{N}} \quad (14)$$

Then, suppose an interval size is predefined as $\delta$, then, based on the equation (15) below, unit 905 may compute the confidence level $(1-\alpha)$ for $$\delta = 2 * t_{\alpha/2} \frac{s}{\sqrt{N}} \quad (15)$$

Finally, based on the confidence level $(1-\alpha)$, entity traffic quality unit 905 determines the entity-level score for the entity E as equal to:

$$(1-\alpha)\bar{x} \quad (16)$$

Here, it may be noted that, as N increases, $(1-\alpha)$ also increases, which is reasonable because, if there are more samples, the confidence that the mean value n falls into the confidence interval will be greater.

Figure 9B:
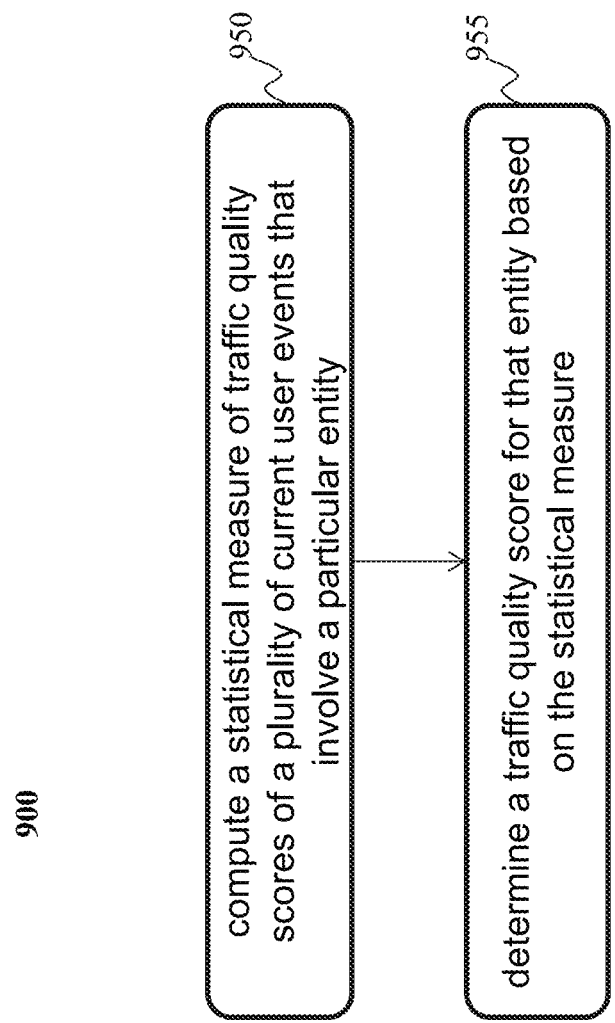
FIG. 9(b) is a flowchart of an exemplary process operated at the entity traffic quality unit, according to the embodiment described above with respect to FIG. 9(a)

FIG. 9(b) is a flowchart of an exemplary process 900 operated at entity traffic quality unit 905, according to the embodiment described above with respect to FIG. 9(a). At 950, traffic quality scores of a plurality of current user events that involve a specific entity e.g., E) and that happened in a specific time period (e.g., one hour, one day, one week, etc.) are received and a statistical measure of the traffic quality scores of those current user events is computed by unit 905, e.g., based on equations (11)-(15). At 955, an entity-traffic quality score for the specific entity E is computed based on the statistical measure by unit 905, e.g., based on equation (16).

There are many potential use cases for the scoring model discussed above with regard to traffic quality engine 170 and the various components thereof, which provide event-level as well entity-level traffic quality scores. For example, with respect to traffic quality insight, given a specific entity such as publisher or advertiser, detailed information about its traffic quality may be obtained through its related event-level traffic quality score distribution. In some embodiments, an alert system may be built based on (event-level or entity-level) traffic quality scores. For example, scores of one or more specific entities, e.g., publishers 130 or advertisers 140, may be monitored, and whenever a score violates (e.g., exceed or is lower than) a predefined threshold, an alert may be sent automatically to the concerned entity to notify about the traffic quality. In this case, responsive to the alert, the entity may take further proactive actions to investigate and detect potential fraud.

Figure 10A:
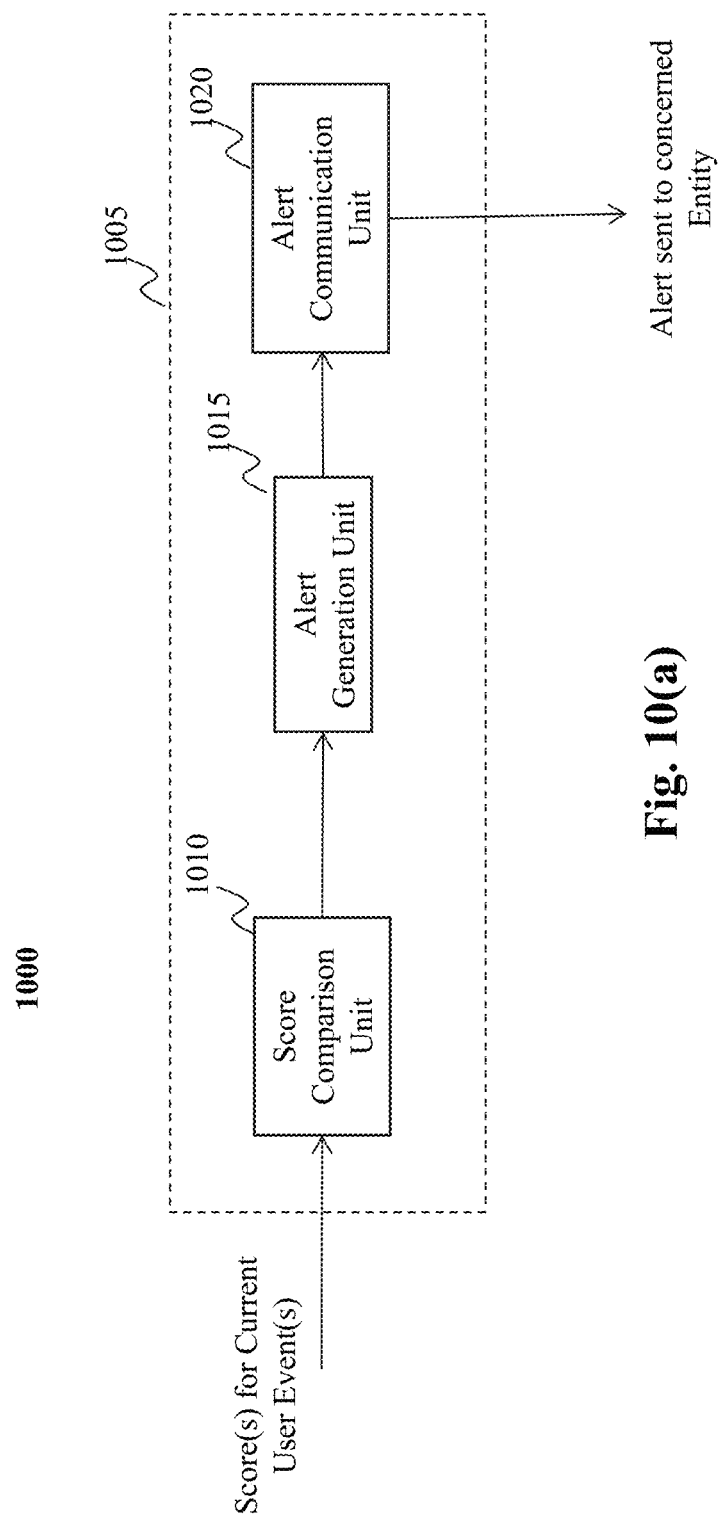
FIG. 10(a) is a high level depiction of an exemplary alert notification unit, according to an embodiment of the present disclosure.

In this regard, the system 100 (in FIGS. 1(a)-1(c)) may further include an alert notification unit 1005, a high level exemplary depiction of which, according to an embodiment of the present disclosure, is shown in FIG. 10(a). Alert notification unit 1005 includes a score comparison unit 1010, an alert generation unit 1015 and an alert transmission unit 1020. Score comparison unit 1010 may be configured to receive event-level score(s) and/or entity-level score(s) related to a specific entity (from traffic quality 170), and compare the (entity-level) score of the specific entity to a predefined threshold to determine if the threshold has been violated, which acts as a trigger to generate an alert for the entity. There may be one or more predefined thresholds associated with (or stored within) unit 1010, which may be preset by various entities (users 110, publishers 130, advertisers 140, etc.) of the system 100. In some embodiments, there is one predefined threshold for each type of entity, which is preset based on the number of entities of that type in the system 100 and/or other system-based factors.

Based on the score-comparison result from unit 1010, alert generation unit 1015 may generate an alert (e.g., in a text message, or as audio, video, and/or in other formats), if the entity-traffic quality score of the specific entity is determined to have violated the threshold. Further, alert transmission unit 1020 may communicate, via the communication platform and/or network 120 and/or other communication means, the alert notification generated at unit 1015 to the specific entity.

Figure 10B:
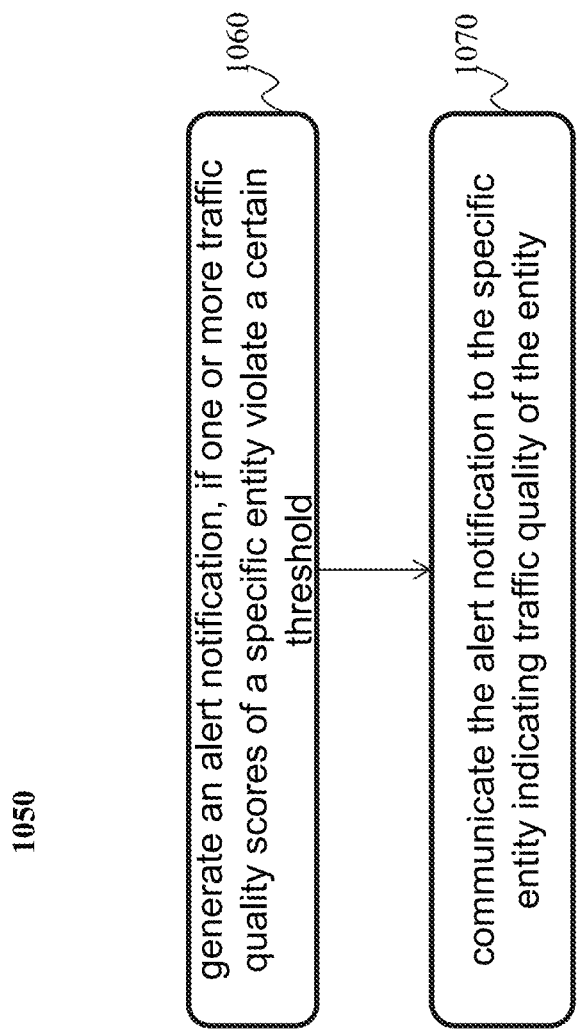
FIG. 10(b) is a flowchart of an exemplary process operated at the alert notification unit, according to the embodiment described above with respect to FIG. 10(a)

FIG. 10(b) is a flowchart of an exemplary process 1050 operated at alert notification unit 1005, according to the embodiment described above with respect to FIG. 10(a). At 1060, based on a score-comparison result for a specific entity (from unit 1010), an alert (e.g., in a text message, or as audio, video, and/or in other formats) may be generated (at alert generation unit 1015), if the entity-traffic quality score of the specific entity is determined to have violated the threshold. At 1070, the alert notification is communicated to the specific entity, indicating that the traffic quality is lower (or higher) than an acceptable level, and further corrective actions may be needed for improve the traffic quality with respect to that entity.

In another embodiment, traffic quality-based pricing or smart pricing, based on the event-level or entity-level scores, may be implemented in the system 100. For example, for entities, e.g., advertisers 140, that suffer low traffic quality as indicated by (relatively) low quality scores, a discount in the advertising services' pricing may be computed by a pricing unit in the system 100, and may be offered, e.g., by publishers 130 to the advertisers 140. The pricing unit may compute the discount on the regular advertising prices or the final discounted price, e.g., by prorating the prices or charges predefined for a certain "regular" traffic score, based on the observed lower traffic score. In another embodiment, the entity-level score may be used for targeting. For example, an advertiser may refuse to target a user/IP/publisher that has scored relatively lower than a certain acceptable score preset for that type of entity.

FIG. 11 depicts a general mobile device architecture on which the present teaching may be implemented. In this example, the user device on which content and advertisement are presented and interacted-with is a mobile device 1100, including, but not limited to, a smart phone, a tablet, a music player, a handled gaming console, a global positioning system (GPS) receiver, and a wearable computing device (e.g., eyeglasses, wrist watch, etc.), or in any other form factor. The mobile device 1100 in this example includes one or more central processing units (CPUs) 1102, one or more graphic processing units (GPUs) 1104, a display 1106, a memory 1108, a communication platform 1110, such as a wireless communication module, storage 1112, and one or more input/output (I/O) devices 1114. Any other suitable component, such as but not limited to a system bus or a controller (not shown), may also be included in the mobile device 1100. As shown in FIG. 11, a mobile operating system 1116, e.g., iOS, Android, Windows Phone, etc., and one or more applications 1118 may be loaded into the memory 1108 from the storage 1112 in order to be executed by the CPU 1102. The applications 1118 may include a browser or any other suitable mobile apps for receiving and rendering content streams and advertisements on the mobile device 1100. User interactions with the content streams and advertisements may be achieved via the I/O devices 1114 and provided to traffic quality engine 170, event info processing module 175 and/or other components of system 100, via the communication platform 1110 and network 120.

To implement various modules, units, and their functionalities described in the present disclosure, computer hardware platforms may be used as the hardware platform(s) for one or more of the elements described herein (e.g., traffic quality engine 170, event processing unit 175, and other related modules/components described with respect to FIGS. 1-10). The hardware elements, operating systems and programming languages of such computers are conventional in nature, and it is presumed that those skilled in the art are adequately familiar therewith to adapt those technologies to implement the traffic quality scoring as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 12:
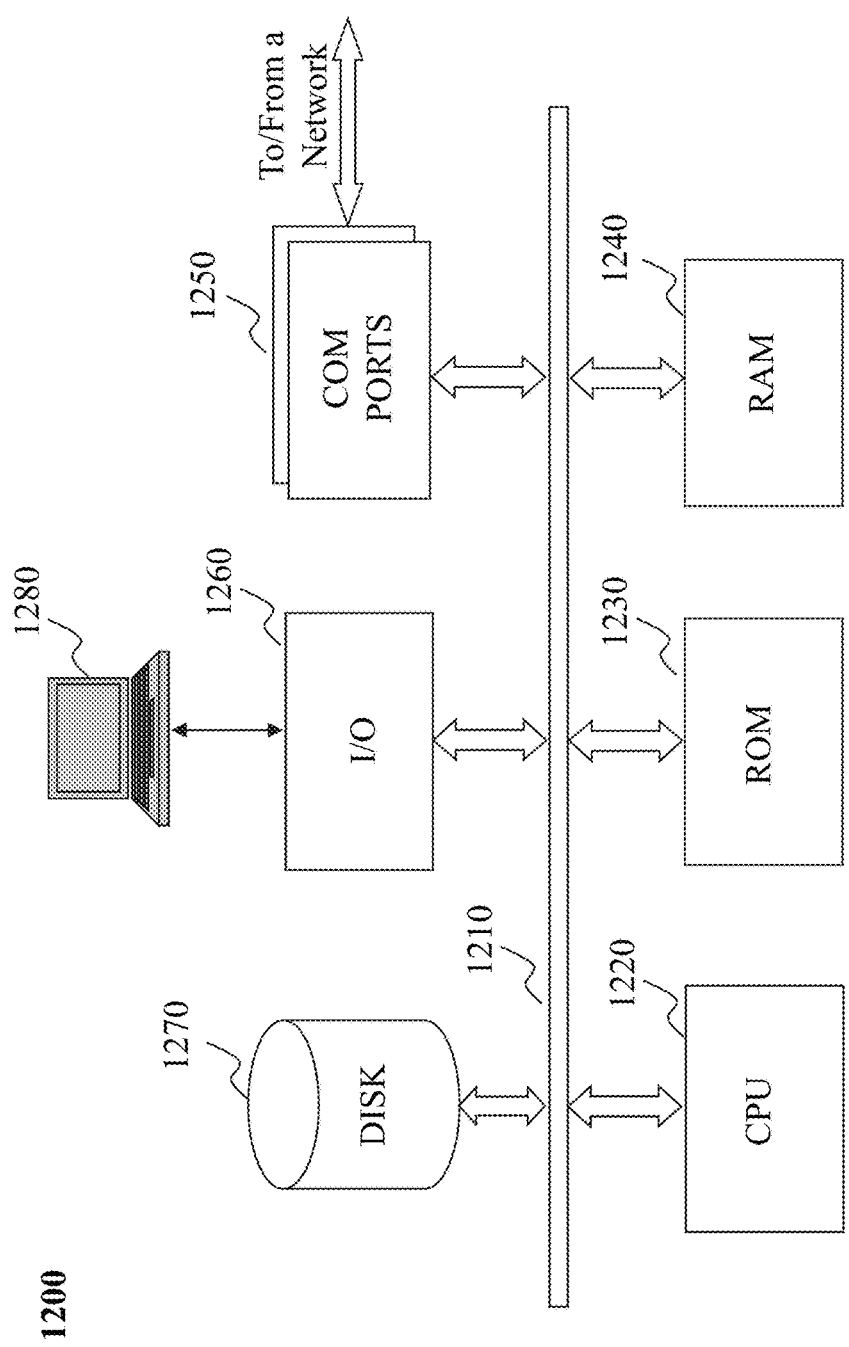
FIG. 12 depicts a general computer architecture on which the present teaching may be implemented.

FIG. 12 depicts a general computer architecture on which the present teaching may be implemented and has a functional block diagram illustration of a computer hardware platform which includes user interface elements. The computer may be a general purpose computer or a special purpose computer. This computer 1200 may be used to implement any component of the traffic quality scoring, as described herein. For example, traffic quality engine 170 and various modules thereof, event info processing unit 175, etc., may all be implemented on a computer such as computer 1200, via its hardware, software program, firmware, or a combination thereof. Although only one such computer is shown, for convenience, the computer functions relating to dynamic relation and event detection may be implemented in a distributed fashion on a number of similar platforms, to distribute the processing load.

The computer 1200, for example, includes COM ports 1250 connected to and from a network connected thereto to facilitate data communications. The computer 1200 also includes a central processing unit (CPU) 1220, in the form of one or more processors, for executing program instructions. The exemplary computer platform includes an internal communication bus 1210, program storage and data storage of different forms, e.g., disk 1270, read only memory (ROM) 1230, or random access memory (RAM) 1240, for various data files to be processed and/or communicated by the computer, as well as possibly program instructions to be executed by the CPU. The computer 1200 also includes an I/O component 1260, supporting input/output flows between the computer and other components therein such as user interface elements 1280. The computer 1200 may also receive programming and data via network communications.

Hence, aspects of the methods of generating event-level and entity level scores and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the search engine operator or other explanation generation service provider into the hardware platform(s) of a computing environment or other system implementing a computing environment or similar functionalities in connection with generating explanations based on user inquiries. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the dynamic relation/event detector and its components as disclosed herein may be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform capable of making a connection to a network to determine traffic quality, the method comprising:
   receiving, via a communication platform, data related to a current user event indicating user interaction with online content, wherein the data related to the current user event comprises information regarding a set of entities associated with the current user event;
   generating, via at least one processor, a feature value set for the current user event based on the information regarding the set of entities associated with the current user event and on information regarding sets of entities associated with a plurality of past user events, wherein the feature value set measures a diversity in traffic across the entities of the sets based on a breadth of distinct users;
   determining, via at least one processor, a traffic quality score for the current user event based at least on the feature value set; and
   responsive to the traffic quality score satisfying a criterion, transmitting an alert to an entity of the sets.

2. The method of claim 1, wherein the traffic quality score for the current user event is determined based on a weighted combination of elements of the feature value set.

3. The method of claim 1, further comprising retrieving, from an event log, data related to the plurality of past user events indicating user interaction with online content, wherein the data related to each of the plurality of past user events comprises the information regarding the set of entities associated with that past user event.

4. The method of claim 1, wherein the traffic quality score for the current user event is determined based on probability values of elements of the feature value set of the current user event, a priori probability value for the plurality of past user events being valid and a priori probability value for the plurality of past user events being invalid,
   wherein the probability values of the elements of the feature value set of the current user event are based on probability distribution of feature value sets of the plurality of past user events.

5. The method of claim 3, wherein said generating comprises generating each element of the feature value set for the current user event based on a weighted combination of corresponding elements of feature value sets of the plurality of past user events.

6. The method of claim 1, further comprising generating an entity-traffic quality score for an entity from the set of entities associated with the current user event based on a statistical measure of traffic quality scores of a plurality of current user events that involve that entity.

7. The method of claim 1, wherein the set of entities associated with the current user event comprises user identification, user IP address, a publisher of the online content, an advertiser that advertises in association with the online content, and a creative entity.

8. The method of claim 1, wherein the current user event comprises a click by the user on an advertisement displayed on a webpage, and a financial transaction related to a product or service associated with the advertisement clicked-on by the user.

9. A machine-readable, tangible, and non-transitory medium having information recorded thereon to determine traffic quality, where the information, when read by a machine, causes the machine to perform at least the following:
   receiving, via a communication platform, data related to a current user event indicating user interaction with online content, wherein the data related to the current user event comprises information regarding a set of entities associated with the current user event;
   generating a feature value set for the current user event based on the information regarding the set of entities associated with the current user event and on information regarding sets of entities associated with a plurality of past user events, wherein the feature value set measures a diversity in traffic across the entities of the sets based on a breadth of distinct users;
   determining a traffic quality score for the current user event based at least on the feature value set; and
   responsive to the traffic quality score satisfying a criterion, transmitting an alert to an entity of the sets.

10. The medium of claim 9, wherein the traffic quality score for the current user event is determined based on a weighted combination of elements of the feature value set.

11. The medium of claim 9, wherein the information, when read by the machine, causes the machine to further perform:
    retrieving, from an event log, data related to the plurality of past user events indicating user interaction with online content, wherein the data related to each of the plurality of past user events comprises the information regarding the set of entities associated with that past user event.

12. The medium of claim 9, wherein the traffic quality score for the current user event is determined based on probability values of elements of the feature value set of the current user event, a priori probability value for the plurality of past user events being valid and a priori probability value for the plurality of past user events being invalid,
    wherein the probability values of the elements of the feature value set of the current user event are based on probability distribution of feature value sets of the plurality of past user events.

13. The medium of claim 9, wherein the information, when read by the machine, causes the machine to further perform: generating an entity-traffic quality score for an entity from the set of entities associated with the current user event based on a statistical measure of traffic quality scores of a plurality of current user events that involve that entity.

14. The medium of claim 9, wherein the set of entities associated with the current user event comprises user identification, user IP address, a publisher of the online content, an advertiser that advertises in association with the online content, and a creative entity.

15. The medium of claim 9, wherein the current user event comprises a click by the user on an advertisement displayed on a webpage, and a financial transaction related to a product or service associated with the advertisement clicked-on by the user.

16. A system having at least one processor, storage, and a communication platform capable of making a connection to a network to determine event-level traffic quality, the system comprising:
- a communication platform configured to receive data related to a current user event indicating user interaction with online content, wherein the data related to the current user event comprises information regarding a set of entities associated with the current user event;
- a feature set engine configured to determine a feature value set for the current user event based on the information regarding the set of entities associated with the current user event and on information regarding sets of entities associated with a plurality of past user events, wherein the feature value set measures a diversity in traffic across the entities of the sets based on a breadth of distinct users;
- a traffic quality engine configured to determine a traffic quality score for the current user event based at least on the feature value set; and
- an alert notification unit configured to transmit, responsive to the traffic quality score satisfying a criterion, an alert to an entity of the sets.

17. The system of claim 16, wherein the traffic quality engine comprises:
- a feature combination unit configured to calculate a weighted combination value of elements of the feature value; and
- a traffic score generator configured to generate the traffic quality score for the current user event based on the weighted combination value from the feature combination unit.

18. The system of claim 16, further comprising:
- a sample event unit configured to retrieve, from an event log, data related to the plurality of past user events indicating user interaction with online content, wherein the data related to each of the plurality of past user events comprises the information regarding the set of entities associated with that past user event.

19. The system of claim 16, wherein the data related to the plurality of past user events retrieved from the event log comprises a priori probability value for the plurality of past user events being valid, a priori probability value for the plurality of past user events being invalid, and feature value sets of the plurality of past user events, and wherein the traffic quality engine comprises:
- a probability calculator to compute probability distribution of the feature value sets of the plurality of past user events, and probability values of elements of the feature value set of the current user event based on the probability distribution of the feature value sets of the plurality of past user events; and
- a traffic score generator configured to generate the traffic quality score for the current user event based on the probability values of elements of the feature value set of the current user event, the a priori probability value for the plurality of past user events being valid and the a priori probability value for the plurality of past user events being invalid.

20. The system of claim 16, further comprising an entity traffic quality unit configured to:
- receive traffic quality scores of a plurality of current user events that involve a specific entity;
- compute a statistical measure of the traffic quality scores of the plurality of current user events; and
- generate an entity-traffic quality score for the specific entity based on the statistical measure.

21. The system of claim 16, wherein the set of entities associated with the current user event comprises user identification, user IP address, a publisher of the online content, an advertiser that advertises in association with the online content, and a creative entity.

22. The system of claim 16, further comprising an event validation unit configured to determine whether the current user event is valid or invalid based on a result of a comparison of the traffic quality score with a certain threshold.

* * * * *